(12) United States Patent
Komine et al.

(10) Patent No.: US 7,871,517 B2
(45) Date of Patent: Jan. 18, 2011

(54) FILTER DEVICE

(75) Inventors: Akiyoshi Komine, Yokohama (JP); Mitsunobu Okamoto, Yokohama (JP)

(73) Assignee: Yamashin-Filter Corp., Kanagawa (JP)

( * ) Notice: Subject to any disclaimer, the term of this patent is extended or adjusted under 35 U.S.C. 154(b) by 435 days.

(21) Appl. No.: 11/935,798

(22) Filed: Nov. 6, 2007

(65) Prior Publication Data

US 2008/0060992 A1 Mar. 13, 2008

Related U.S. Application Data

(63) Continuation of application No. PCT/JP2006/320509, filed on Oct. 13, 2006.

(60) Provisional application No. 60/734,042, filed on Nov. 3, 2005.

(30) Foreign Application Priority Data

| Oct. 13, 2005 | (JP) | ............................ 2005-299421 |
| Oct. 13, 2005 | (JP) | ............................ 2005-299422 |
| Sep. 13, 2006 | (JP) | ............................ 2006-248466 |

(51) Int. Cl.
*B01D 29/88* (2006.01)
*B01D 35/00* (2006.01)
*B01D 35/02* (2006.01)
*B01D 27/00* (2006.01)

(52) U.S. Cl. ...................... 210/248; 210/429; 210/431; 210/418; 210/436; 210/440; 210/450

(58) Field of Classification Search ................. 210/248, 210/429, 431
See application file for complete search history.

(56) References Cited

U.S. PATENT DOCUMENTS

| 2,693,281 | A | * | 11/1954 | Winzen ...................... 210/423 |
| 5,102,543 | A | * | 4/1992 | Burroughs .................. 210/282 |
| 5,879,544 | A | * | 3/1999 | Cassidy ...................... 210/90 |
| 2002/0104980 | A1 | * | 8/2002 | Jainek ..................... 251/149.6 |
| 2004/0144734 | A1 | * | 7/2004 | Suzumori et al. ........... 210/767 |
| 2006/0086922 | A1 | | 4/2006 | Jensen et al. |

OTHER PUBLICATIONS

European Search Report for European Application No. 06811782.9, dated Dec. 18, 2009, 4 pages.

* cited by examiner

*Primary Examiner*—Krishnan S Menon
*Assistant Examiner*—Benjamin Kurtz
(74) *Attorney, Agent, or Firm*—Brinks Hofer Gilson & Lione

(57) ABSTRACT

The filter device (10) is provided with a drain device (50) provided with a main body (51) and a plug (60). The main body (51) has a first opening (51a) which communicates to the outer side of a housing (20), a second opening (51b) which communicates with an inner side (42a) of a filter element (40), and a third opening (56) which communicates with a first channel (51c) communicating to the first opening (51a) and the second opening (51b) and a space (B) between the filter element (40) and the housing (20). The plug (60) is held within the first channel (51c), and is movable between a first position (P1) at which fluid is not discharged from the housing (20), and a second position (P2) at which fluid is discharged from the housing (20). The plug (60) is provided with a second channel (65) that communicates with the first channel (51c) and communicates with the outer side of the housing (20) when in the second position (P2).

7 Claims, 18 Drawing Sheets

FILTER DEVICE

This application is a continuation of PCT Application No. PCT/JP2006/320509 filed Oct. 13, 2006, which claims priority to Japanese Patent Application Nos. 2006-248466 filed Sep. 13, 2006, 2005-299421 filed Oct. 13, 2005 and 2005-299422 filed Oct. 13, 2005, and U.S. Provisional Application No. 60/734,042 filed Nov. 3, 2005, the entire contents of which are incorporated herein by reference.

FIELD OF TECHNOLOGY

The present invention relates to a filter device used for filtering fluid that circulates in a hydraulic circuit of hydraulic equipment having, for example, a hydraulic actuator.

BACKGROUND

Equipment having an actuator, such as a hydraulic cylinder, is equipped with a filter device for filtering fluid such as operating oil that circulates in a hydraulic circuit. The filter device is provided with a housing, and a filter element which filters the fluid that is to be filtered, and which is contained within the housing.

When a filter device is used beyond a certain period of time, the performance of the filter element degrades due to clogging and the like, and the filter element is therefore replaced.

The housing is provided with a drain valve for discharging the operating oil from the housing. When opening the housing, for example, when replacing the filter element, first, the operating oil is discharged from the housing by opening the drain valve.

This type of drain valve is formed in the housing, and is held in a hole which communicates between the inner side and the outer side of the housing.

BRIEF SUMMARY

The filter element has, for example, a filter material in the shape of a cylinder, and in cases where the construction is such that the operating oil is filtered due to the fact that the operating oil passes through the filter material and migrates between the inner side and the outer side of the filter material, operating oil also remains on the inner side of the filter element.

However, when a drain valve of the type described above is used, operating oil remaining in the space specified between the housing and the filter material is discharged, but operating oil remaining on the inner side of the filter element becomes difficult to discharge. A great amount of time is required until the operating oil remaining on the inner side of the filter material passes through the filter material and exits to the outer side of the filter material.

Accordingly, in the case of a filter device provided with a filter element having a cylindrical filter material, a great amount of time is required to discharge operating oil through the drain valve. It is also conceivable that operating oil remains inside the filter element after it is removed. In this case, it is conceivable that the remaining operating oil could spill onto the surrounding area, which would be undesirable. In either of these cases, the operation of replacing the filter element is inefficient.

Therefore, the object of the present invention is to provide a filter device that makes it possible to efficiently replace the filter element.

The filter device of the present invention is provided with a filter element, a housing, and a drain device. The filter element is in the shape of a cylinder that has an annular surrounding wall. The filter element filters the fluid that is to be filtered by allowing it to pass through the surrounding wall and move between the inner side and the outer side of the surrounding wall. The housing holds the filter element on its inner side. The drain device discharges the fluid from the housing. The drain device is provided with a main body, a plug, and a seal structure. The main body has a first opening that communicates with the outer side of the housing, a second opening that communicates with the inner side of the filter element, a first channel that communicates with the first opening and the second opening, and a third opening that communicates between the first channel and the space between the filter element and the housing. The plug is held within the first channel, and is movable between a first position at which the fluid is not discharged from the housing and a second position at which the fluid is discharged from the housing. The plug communicates with the first channel when in the second position, and is provided with a second channel which communicates through the first opening with the outer side of the housing. The seal structure which fluid-tightly closes between the second opening and the third opening when the plug is in the first position, and fluid-tightly closes between the inner side of the filter element and the outer side of the housing, as well as between the space between the filter element and the housing, and the outer side of the housing.

In accordance with this construction, the fluid remaining between the filter element and the housing and the fluid remaining on the inner side of the filter element can be discharged simultaneously. Thus, the time required to discharge fluid from the housing can be shortened.

In a preferred embodiment of the present invention, the filter device is provided with a positioning mechanism for positioning the plug at the first position.

In accordance with this construction, the plug is prevented from moving to the second position when using the filter device.

In a preferred embodiment of the present invention, the positioning mechanism is provided with an impelling member, a first contact part, and a second contact part. The impelling member impels the plug from the second position toward the first position. The first contact part is provided to the plug. The second contact part is provided to the main body. The second contact part makes contact with the first contact part in the direction of impulsion of the impelling member when the plug is in the first position.

In accordance with this construction, when the plug moves to the second position, it is sufficient to push the plug in the direction opposite to the direction of impulsion.

In a preferred embodiment of the present invention, a holding mechanism is provided to hold the plug in the second position, when the plug is in the second position.

In a preferred embodiment of the present invention, a holding mechanism and a groove formed on the outer periphery of the plug are provided, as well as an engaging part held in the groove and removably attached to the main body.

In a preferred embodiment of the present invention, the seal structure is provided with seal members. The seal members are disposed along the direction of movement of the plug in the side wall of the plug such that they are located to have the third opening between them when the plug is in the first position, in order to fluid-tightly seal the third opening by making contact with the inner wall of the main body. The position where the seal members are disposed runs parallel to the direction of said movement.

In accordance with this construction, when the plug is in the first position, the pressure of the fluid in the housing, which passes through the third opening, operates on the plug between the seal members. The position where the seal members are disposed runs parallel to the direction of a held member. In other words, a hypothetical line connecting the positions at which the seal members are disposed, is parallel to the direction of motion. Accordingly, even if the pressure of the fluid passing through the third opening operates on the held member, the product of the pressure on the side of one seal member and the surface area on which said pressure operates, and the product of the pressure on the other seal member and the surface area on which said pressure operates are equal, so the loads operating in the direction of motion of the plug are mutually cancelled out.

Furthermore, the filter device of the present invention is provided with a filter element, a housing, and a drain device. The filter element is in the shape of a cylinder having an annular surrounding wall. The fluid that is to be filtered is filtered by passing through the wall and moving between the inner side and the outer side of the surrounding wall. The housing holds the filter element on its inner side. The drain device discharges the fluid from the housing. The drain device is provided with a main body, a held member, an inserted member, and a seal structure. The main body has a first opening that communicates with the outer side of the housing, a second opening that communicates with the inner side of the filter element, a first channel that communicates with the first opening and the second opening, and a third opening that communicates between the first channel and the space between the filter element and the housing. The held member is held within the first channel, and is movable between a non-discharge position at which the fluid is not discharged from the housing and a discharge position at which the fluid is discharged from the housing, and it does not exit to the outer side of the main body through the first opening when in the discharge position or in the non-discharge position. The inserted member passes through the first opening and is inserted removably into the first channel, and positions the held member in the discharge position and the inserted member also has a channel that communicates with the first channel and communicates with the outer side of the housing through the first opening. The seal structure, when the inserted member is in the non-discharge position, fluid-tightly closes between the second opening and the third opening, and fluid-tightly closes between the inner side of the filter element and the outer side of the housing, and between the outside of the housing and the space between the filter element and the housing.

In accordance with this construction, the fluid remaining between the filter element and the housing and the fluid remaining on the inner side of the filter element can be discharged simultaneously. Thus, the time required to discharge fluid from the housing can be shortened. Moreover, in this embodiment, in addition to discharging the fluid from the housing, the inserted member is separated. Accordingly, the inserted member is prevented from unexpectedly moving to the discharge position.

In a preferred embodiment, the seal structure is provided with seal members. The seal members are disposed along the direction of movement of the held member in the side wall of the held member such that they are located to have the third opening between them when the held member is in the non-discharge in order to fluid-tightly seal the third opening by making contact with the inner wall of the main body. The position where the seal members are disposed runs parallel to the direction of said movement.

In accordance with this construction, when the held member is in the non-discharge position, the pressure of the fluid in the housing, which passes through the third opening, operates on the held member between the seal members. The position where the seal members are disposed runs parallel to the direction of the held member. In other words, a hypothetical line connecting the positions at which the seal members are disposed, is parallel to the direction of motion. Accordingly, even if the pressure of the fluid passing through the third opening operates on the held member, the product of the pressure on the side of one seal member and the surface area on which said pressure operates, and the product of the pressure on the other seal member and the surface area on which said pressure operates are equal, so the loads operating in the direction of motion of the held member are mutually cancelled out.

In a preferred embodiment of the present invention, the filter device is provided with a vent valve device. The vent valve device is provided with a vent valve device main body, a vent valve device plug, and a vent valve device seal structure. The vent valve device main body has a first vent valve device opening that communicates with the outer side of the housing, a second vent valve device opening that communicates with the inner side of the filter element, a first vent valve device channel that communicates between the first vent valve device opening and the second vent valve device opening, and a third vent valve device opening that communicates between the first vent valve device channel and the space between the filter element and the housing. The vent valve device plug is held within the first vent valve device channel, and is movable between the vent valve device non-discharge position at which gas is not discharged from the housing and the vent valve device discharge position at which gas is discharged from the housing. The vent valve device plug communicates with the second vent valve device opening and the third vent valve device opening when in the vent valve device discharge position, and is provided with a second vent valve device channel that communicates through the first vent valve device opening with the outer side of the housing. The vent valve device seal structure forms an air-tight seal between the inner side of the filter element and the outer side of the housing, and between the outer side of the housing and the space between the filter element and the housing, when in the vent valve device non-discharge position.

In accordance with this construction, the gas remaining between the filter element and the housing and the gas remaining inside the filter element can be discharged simultaneously. Thus, the time required to discharge gas from the housing can be shortened.

Furthermore, since the inner side of the filter element and the space between the housing and the filter element can each communicate with the outer side of the housing, it is possible to supply a gas such as air to the inner side of the filter element even in cases where fluid is discharged from the housing.

In a preferred embodiment of the present invention, the filter device is provided with a vent valve device positioning mechanism for positioning the vent valve device plug at the vent valve device non-discharge position.

In accordance with this construction, when using the filter device, the vent valve device plug is prevented from moving to the vent valve device discharge position.

In a preferred embodiment of the present invention, the vent valve device positioning mechanism is provided with a vent valve device impelling member, a first vent valve device contact part, and a second vent valve device contact part. The vent valve device impelling member impels the vent valve device plug from the vent valve device discharge position toward the vent valve device non-discharge position. The vent valve device contact part is provided to the vent valve device plug. The second vent valve device contact part is provided to the vent valve device main body. The second vent valve device contact part makes contact with the first vent valve device contact part in the direction of impulsion of the vent valve device impelling member when the vent valve device plug is in the vent valve device non-discharge position.

In accordance with this construction, when the vent valve plug device moves to the vent valve device discharge position, it is sufficient to push the vent valve device plug in the direction opposite to the direction of impulsion.

In a preferred embodiment of the present invention, a vent valve device holding mechanism is provided to hold the vent valve device plug in the vent valve device discharge position, when the vent valve device plug is in the vent valve discharging position.

In accordance with this construction, the vent valve device plug is prevented from being in a fourth position when discharging gas from the housing.

In a preferred embodiment of the present invention, the vent valve device holding mechanism is provided with a vent valve device groove formed on the outer periphery of the vent valve device plug and a vent valve device engaging part held in the vent valve device groove and removably attached to the vent valve device main body.

In accordance with this construction, the vent valve device holding mechanism has a relatively simple structure, being provided with a vent valve device groove and a vent valve device engaging part.

DETAILED DESCRIPTION OF THE PREFERRED EMBODIMENTS

Figure 1:
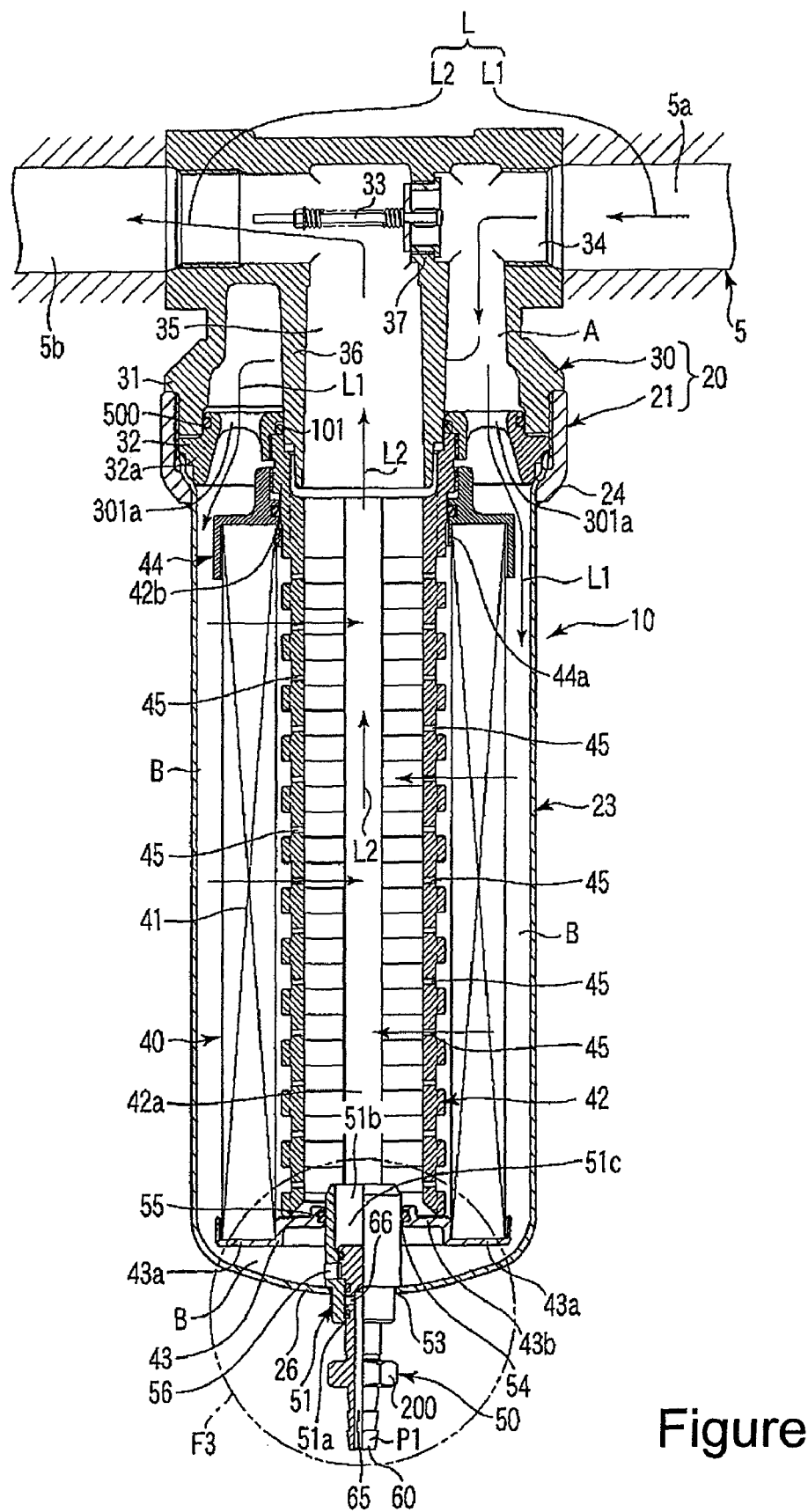
FIG. 1 is a sectional view of a filter device according to the first embodiment of the present invention.

A filter device 10 according to the first embodiment of the present invention is described using FIG. 1 to FIG. 4. FIG. 1 is a sectional view of the filter device 10. The filter device 10 of this embodiment is incorporated into a hydraulic circuit 5 of a hydraulic actuator, for example, heavy machinery and the like. Operating oil L flows in the hydraulic circuit 5. FIG. 1 shows the state in which the filter device 10 is incorporated into a hydraulic circuit 5.

The hydraulic circuit 5 is provided with an outflow part 5a and an inflow part 5b. Operating oil L1 that is to be filtered with the operating oil L is supplied to the filter device 10, passing through the outflow part 5a. The filtered operating oil L2 passes through the inflow part 5b and is returned to the hydraulic circuit 5.

Figure 2:
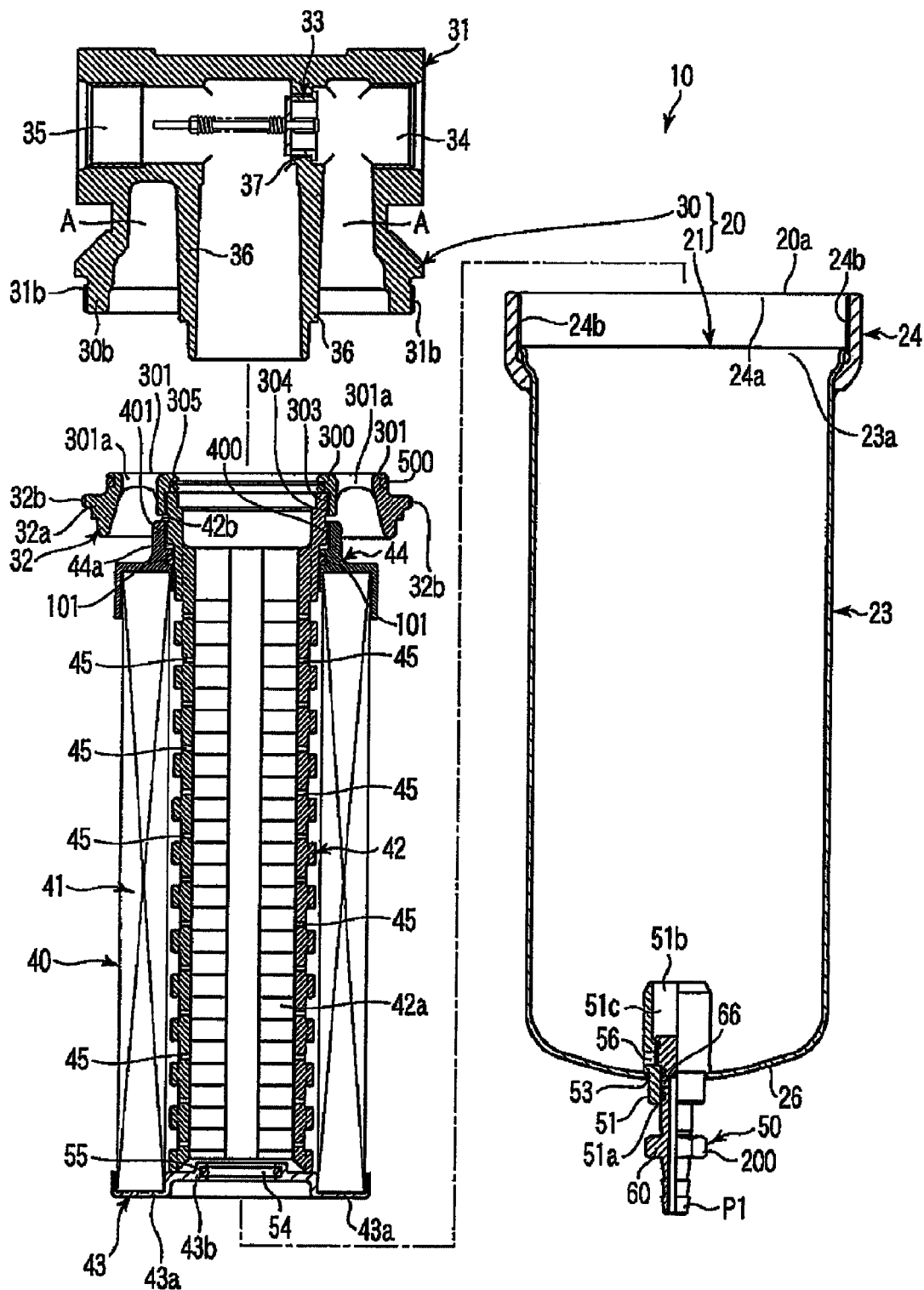
FIG. 2 is a sectional view showing the state in which the filter device of FIG. 1 has been disassembled.

FIG. 2 is a sectional view showing the state in which the filter device 10 has been disassembled. As shown in FIG. 1 and FIG. 2, the filter device 10 is provided with a housing 20, a filter element 40, and a drain device 50.

The housing 20 is provided with a housing main body 21 and a head 30. The housing main body 21 is provided with a first member 23 and a second member 24.

The first member 23 is a member that has one end approximately closed, and is, for example, in the shape of a cylinder. The second member 24 is a member with its inner side formed in almost the same manner as the inner periphery of the first member 23, and is, for example, in the shape of a cylinder. Both ends of the second member 24 are open.

The open end 23a of the first member 23 and one of the open ends 24a of the second member 24 are joined together, by welding, for example, so that the inner periphery surfaces mutually form approximately a single surface. Accordingly, the housing main body 21 is approximately closed at one end, and the other end is open and approximately cylindrical in shape.

The head 30 is provided with a relief valve 33. The head 30 has an inlet 34 and an outlet 35. As shown in FIG. 1, the inlet 34 is connected to the outflow part 5a of the hydraulic circuit 5. The inlet 34 is bent approximately in the shape of the letter L. The inlet 34 bends toward the filter element 40 which is coupled to the head 30 as described below.

As shown in FIG. 2, the head 30 has a protruding part 36 formed at approximately the center thereof. The protruding part 36 protrudes in the direction of the filter element 40 which is coupled to the head 30 as described below. Within the head 30 is seat a space A between the protruding part 36 and a surrounding wall 30b of the head 30. The space A communicates with the inlet 34. The surrounding wall 30b is, for example, cylindrical in shape, and approximately engages with the open end 24a. A male screw part 31b is formed on the outer periphery of the surrounding wall 30b.

One end of the outlet 35 is formed within the protruding part 36. One end of the outlet 35 opens to the front end of the protruding part 36. As shown in FIG. 1, the other end of the outlet 35 is connected to the inflow part 5b of the hydraulic circuit 5.

As shown in FIG. 2, the inlet 34 and the outlet 35 are adjacent to each other, being mutually separated by a wall part 37. A relief valve 33 is provided at the wall part 37. When the relief valve 33 is opened, the inlet 34 and the outlet 35 communicate with each other. When the pressure of the operating oil L1 flowing into the inlet 34 exceeds a predetermined value, then the relief valve 33 opens.

Due to the fact that the housing main body 21 and the head 30 are coupled together, as described above, the protruding part 36 of the head 30 protrudes into the housing main body 21. The protruding part 36 is positioned concentrically above the housing main body 21.

The filter element 40 is inserted into the housing main body 21 from an opening 20a of the housing main body 21 (opening end 24a of the second member 24). As shown in FIG. 2, the filter element 40 is provided with a filter material 41, an inner cylinder 42, a first supporting member 43, a second supporting member 44, and an element pressing member 32.

The filter material 41 is made from a resin, and is rounded in a pleated configuration, for example. The filter material 41 is the surrounding wall of the filter element referred to in the present invention. The inner cylinder 42 is cylindrical in shape. On the surrounding wall of the inner cylinder 42 is formed a plurality of pores 45 which radially pass through said surrounding wall.

The inner cylinder 42 is contained on the inner side of the filter material 41. The upper end of the inner cylinder 42 protrudes upward beyond the upper end of the filter material 41. The inner cylinder 42 is disposed approximately concentrically with the filter material 41. When the filter material 41 is impelled toward the inner side, the filter material 41 is supported due to the fact that the inner cylinder 42 makes contact with the filter material 41, thereby preventing the filter material 41 from changing shape in the direction of the inner side.

The first supporting member 43 supports the lower end of the filter material 41 and the lower end of the inner cylinder 42. The first supporting member 43 has a first area 43a facing the filter material 41, and a second area 43b facing the inner side 42a of the inner cylinder 42. The inner side 42a of the inner cylinder 42 is an inner side space of the filter element 40.

The second supporting member 44 supports the upper end of the filter material 41 and the upper end part 42b of the inner cylinder 42. On the second supporting member 44 is formed an engaging hole 44a which is engaged with the upper end part 42b. An O-ring 101 is provided between the upper end part 42b and the edge of the engaging hole 44a.

The O-ring 101 forms a fluid-tight seal between the upper end part 42b and the edge of the engaging hole 44a. A male screw part 400 is formed on the outer periphery of the upper end part 42b. A female screw part 401 is formed on the inner periphery of the engaging hole 44a. The inner cylinder 42 is affixed to the second supporting member 44 due to the fact that the male screw part 400 and the female screw part 401 are screwed together.

The element pressing member 32 is a member which immobilizes the filter element 40 within the housing main body 21 so that the filter element 40 does not come out of the housing main body 21. The element pressing member 32 is attached to the upper end part 42b.

The element pressing member 32 has a main body unit 300 immobilized on the upper end part 42b and an expanding part 301 that expands in the direction of the periphery of the upper end part 42b.

The main body unit 300 is, for example, in the shape of a cylinder, and the upper end part 42b engages with its inner side. A female screw part 303 is formed on the inner peripheral part of the main body unit 300. A male screw part 304, which screws into the female screw part 303, is formed on the outer periphery of the upper end part 42b. The male screw part 304 is formed partially exiting to the outer side of the second support member 44 on the upper end part 42b. The main body unit 300 is immobilized on the upper end part 42b due to the fact that the male screw part 304 is screwed into the female screw part 303.

Furthermore, along the inner periphery of the main body unit 300, the front end part of the protruding part 36 approximately engages with the side opposite to that on which the upper end part 42b is immobilized. An O-ring 305, which forms a fluid-tight seal with the protruding part 36, is formed on the inner periphery of the main body unit 300. Accordingly, the inner side 42a of the inner cylinder 42 and the outlet 35 communicate with each other.

The expanding part 301 is formed integrally with the outer periphery of the main body unit 300. The expanding part 301 expands to reach the inner surface of the second member 24 of the housing 21 when the filter element 40 is contained within the housing main body 21. As shown in FIG. 1, a plurality of pores 301a, which communicate with the space A, are formed on the expanding part 301.

A male screw part 32b is formed on the outer periphery part 32a of the expanding part 301. A female screw part 24b is formed on the inner periphery of the second member 24. The element pressing member 32 is immobilized on the second member 24 due to the fact that the male screw part 32b is screwed into the female screw part 24b.

The filter element 40 is immobilized within the housing main body 21 due to the fact that the male screw part 32b is screwed into the female screw part 24b when the filter element 40 with the structure described above is inserted into the housing main body 21.

When the unit formed from the filter element 40 and the housing main body 21 that are mutually immobilized as described above is attached to the head 30 by screwing the male screw 31b into the female screw 24b, due to the fact that the protruding part 36 engages with the inside of the main body unit 300, the outlet 35 and the inner side 42a of the inner cylinder 42 communicate with each other, via the main body unit 300.

At this time, as shown in FIG. 1, a portion of the outer periphery part 32a faces the inner surface of the surrounding wall 30b of the head 30. An O-ring 500 is provided to the portion of the outer periphery part 32a that faces the surrounding wall 30b of the head 30. The O-ring 500 forms a fluid-tight seal between the outer periphery part 32b and the surrounding wall 30b.

Since the filter element 40 is formed as described above, it is approximately cylindrical in shape. As shown in FIG. 1, the operating oil L1 that is to be filtered, passes through the inlet 34 and the space A, and then reaches the outer side of the filter material 41.

A space B, which allows as much of the operating oil L1 to flow as possible, is disposed between the filter element 40 and the housing 20. This space B is provided between the first supporting member 43 and the closed end 26 of the housing main body 21. The space B communicates with the space A via the pores 301a.

The drain device 50 is provided to the closed end 26 of the housing main body 21. The closed end 26 is the lower end of the housing 21. In detail, as shown in FIG. 1, at the closed end 26, the drain device 50 is disposed in a position facing the second area 43b of the first supporting member 43.

Figure 3:
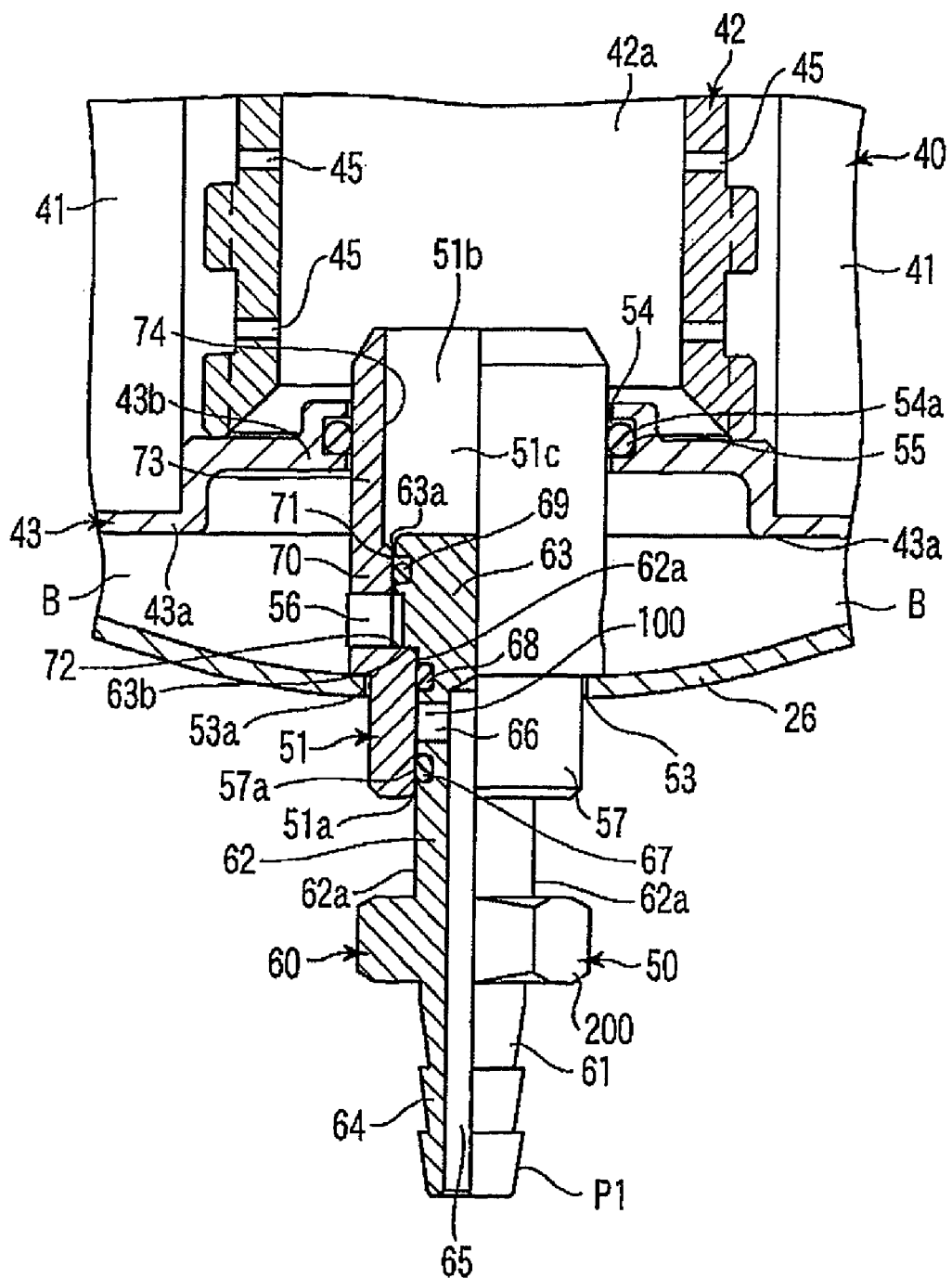
FIG. 3 is a sectional view showing an enlargement of the area indicated by F3 in FIG. 1.

FIG. 3 is a sectional view showing an enlargement of the area indicated by F3 in FIG. 1. As shown in FIG. 3, the drain device 50 is provided with a main body 51 and a plug 60.

The main body 51 is a cylindrical member. The main body 51 is disposed from the outer side of the housing 20 across the inner side 42a of the inner cylinder 42. A pore 53 is formed in which the main body 51 is fit. The pore 53 passes through the closed end 26 of the housing 20. The main body 51 is affixed to the edge part 53a of the pore 53, by welding, for example. A pore 54 is formed in the second area 43b of the first supporting member 43. The pore 54 passes through the first supporting member 43. An O-ring 55 which forms a fluid-tight seal with the main body 51, is disposed at the edge part 54a of the pore 54.

A first opening 51a at one end of the main body 51 opens to the outer side of the housing 20. A second opening 51b at the other end of the main body 51 opens to the inner side 42a of the inner cylinder 42. The first opening 51a and the second opening 51b communicate with each other. The inner side of the main body 51 functions as a first channel 51c referred to in the present invention.

Accordingly, the inner side 42a of the inner cylinder 42 communicates with the outer side of the housing 20 via the second opening 51b and the first channel 51c and the first opening 51a.

In the main body 51, there is formed a third opening 56 in the part that passes through the space B (the part extending from the closed end 26 of the housing 20 up to the first supporting part 43). The third opening 56 communicates with the first channel 51c.

In the drawings, the third opening 56 is positioned below the second opening 51b. Also, the direction of opening of the second opening 51b and the direction of opening of the third opening 56 are at approximately 90 degree angles to each other.

The plug 60 is contained within the first channel 51c of the main body 51. In the drawings, the interior of the plug 60 is shown by cutting away a portion thereof. The plug 60 has an elongated configuration in one direction, and has a first part 61, a second part 62, and a third part 63.

The first part 61 is a part that always sticks out to the outer side, passing through the first opening 51a. An attaching part 64, to which a hose or the like (not depicted) is attached, is formed on the first part 61.

The second part 62 continues with the first part 61. The second part 62 is a part with a shape that engages with the end part 57 of the first opening 51a in the main body 51, and slides along the inner periphery surface 57a of the end part 57.

A second channel 65 is formed inside the plug 60. The second channel 65 is formed across the area of the first part 61 and the second part 62. The second channel 65 opens to the outer side from the front end of the first part 61.

A fourth opening 66 is formed in the second part 62. The fourth opening 66 communicates with the second channel 65, as well as with the outer side of the plug 60. O-rings 67 and 68 are formed on the outer periphery of the second part 62, with the fourth opening 66 disposed between them on both sides. The O-rings 67 and 68 form a fluid-tight seal between the inner periphery surface 57a of the end part 57 of the main body 51 and the plug 60.

Now follows an explanation of the length of the second part 62. The second part 62 has a length sufficient to enable the plug 60 to slide between the first position P1 and the second position P2 with respect to the main body 51.

The first position P1 is the position at which the fourth opening 66 is fluid-tightly sealed by the inner periphery surface 57a of the end part 57, as shown in FIG. 3. Accordingly, a fluid-tight seal is formed between the inner side 42a of the inner cylinder 42 and the outside of the housing 20. A fluid-tight seal is formed between the space B and the outer side of the housing 20. Thus, when the plug 60 is in the first position P1, the operating oil L1 and L2 in the housing 20 is not discharged. The inner periphery surface 57a and the O-rings 67 and 68 form what is referred to in the present invention as a seal structure 100.

Figure 4:
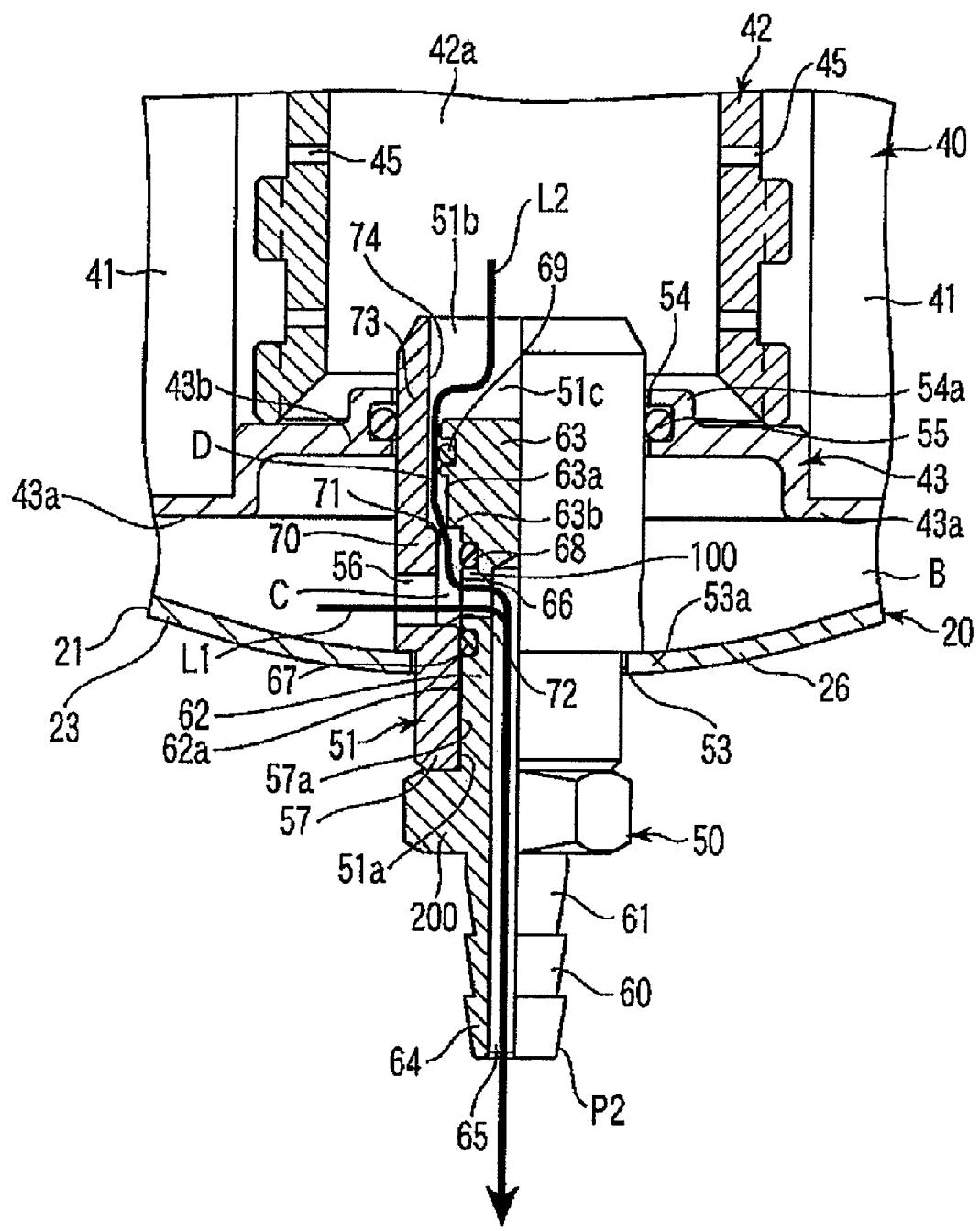
FIG. 4 is a sectional view showing the state in which the plug shown in FIG. 3 is in the second position.

The second position P2 is the position at which the fourth opening 66 faces the third opening 56 of the main body 51, as shown in FIG. 4. When the plug 60 is in the second position P2, the space B within the housing, the inner side 42a of the inner cylinder 42, and the second channel 65 of the plug 60 communicate, via the third opening 56, and the fourth opening 66, and the first channel 51c.

For example, a stopper 200 is provided to the first part 61. The stopper 200 touches the end surface of the main body 51 when the plug 60 is pushed upward to the second position P2. That is to say, when the stopper 200 pushes the plug 60 upwards to touch the main body 51, the space B within the housing, the inner side 42a of the inner cylinder 42, and the second channel 65 of the plug 60 communicate with each other.

The third part 63 is a part on the plug 60 on the side opposite to the first part 61, with the second part 62 disposed between them. The third part 63 communicates with the second part 62. As shown in FIG. 3, when the plug 60 is in the first position P1, a fluid-tight seal is formed between the second opening 51b and the third opening 56.

Now follows a detailed explanation regarding this point. An inner periphery surface 71 of a center part 70 disposed on the inner side from the end part 57 in the axial direction in the main body 51, that is to say, an inner periphery surface 71 in the vicinity of the third opening 56 in the main body 51, is positioned further toward the outer side than the inner periphery surface 57a of the end part 57. In other words, a step-like gradation is formed in the axial direction between the inner periphery surface 57a and the inner periphery surface 71.

The third part 63 is contained within the center part 70. The outer periphery surface 63a of the third part 63 is positioned further toward the outer side than the outer periphery surface 63a of the second part 62. That is to say, the cross-sectional shape of the third part 63 is larger than the cross-sectional shape of the second part 62 towards the outer side in the peripheral direction.

As described above, there is a step-like gradation between the inner periphery surface 71 and the inner periphery surface 57a, and the inner periphery surface 71 is positioned further toward the outer side than the inner periphery surface 57a. Therefore, there is step-like gradation between the outer periphery surface 63a of the third part 63 and the outer periphery part 62a of the second part 62. A front end surface 63b of the third part 63 on the side of the second part 62 makes contact with a step-like gradation part 72 between the inner periphery surface 57a and the inner periphery surface 71.

An O-ring 69 on the side opposite from the O-ring 68 is provided to the third part 63, with the third opening 56 disposed in between, when the plug 60 is at the first position P1. The O-ring 69 forms a fluid-tight seal between the inner periphery surface 71 and the third part 63, when the plug 60 is at the first position P1.

Accordingly, when the plug 60 is at the first position P1, the front end surface 63b of the third part 63 makes contact with the step-like gradation part 72, and the third opening 56 is fluid-tightly sealed by the O-rings 68 and 69.

That is to say, the inner side 42a of the inner cylinder 42 and the space B no longer communicate with each other when the plug 60 is in the first position P1, since a fluid-tight seal is formed between the third opening 56 and the second opening 51b, due to the fact that the third opening 56 is fluid-tightly sealed. Accordingly, the third part 63 forms what is referred to in the present invention as a seal structure 100.

Furthermore, an inner periphery surface 74 of a part 73 extending from the center part 70 to the second opening 51b in the main body 51 is positioned further toward the outer side than the inner periphery surface 71 of the center part 70. As shown in FIG. 4, when the plug 60 is in the second position P2, a portion of the second part 62 faces the inner periphery surface 71 of the center part 70 of the main body 51, so a space C is specified between the inner periphery surface 71 and the outer periphery part 62a of the second part 62.

Moreover, a space D is specified between the inner periphery surface 74 of the part 73 from the center part 70 to the second opening 51b, and the outer periphery surface 63a of the third part 63. These spaces C and D communicate with each other.

Accordingly, when the plug 60 is in the second position P2, the inner side 42a of the inner cylinder 42 and the outer side of the housing 20 communicate via the second opening 51b, the space C, the space D, the fourth opening 66, and the second channel 65. The space B and the outer side of the housing 20 communicate via the third opening 56, the space C, the fourth opening 66, and the second channel 65.

As shown in FIG. 1, in the case of the filter device 10 constructed in such a manner, the operating oil L1 that is to be filtered flows from the outflow part 5a of the hydraulic circuit 5 into the inlet 34 of the head 30. The operating oil L1 passes through the inlet 34, and the space A specified in the area of the protruding part 36, and arrives between the filter material 41 and the housing 20.

The operating oil L1 that has reached the outer side of the filter material 41 is filtered in the process of passing through the filter material 41, as shown by the arrow. The operating oil L2 that has passed through the filter material 41 and has been filtered passes through the pores 45 of the inner cylinder 42, and exits to the inner side of the inner cylinder 42.

Then, the filtered operating oil L2 flows into the inflow part 5b of the hydraulic circuit 5 via the outlet 35, and returns to the hydraulic circuit 5.

Accordingly, when using the filter device 10, the inner side 42a of the inner cylinder 42 is filled with the filtered operating oil L2. Therefore, the plug 60 is impelled toward the first position P1, since the pressure of the filtered operating oil L2 operates on the plug 60.

When removing the housing main body 21 from the head 30, for example, when replacing the filter element 40, the position of the plug 60 is moved to the second position P2 by pushing it upwards. Accordingly, the filtered operating oil L2 remaining in the inner side 42a of the inner cylinder 42, and the operating oil L1 that is to be filtered and is remaining in the space B, are simultaneously discharged to outside of the housing 20.

The filter device 10 constructed in this manner is able to simultaneously discharge the operating oil L1 and L2 remaining in the space B and in the inner side 42a of the filter element 40. Accordingly, it is possible to reduce the time needed to discharge operating oil from the housing 20. Therefore, the operating efficiency can be enhanced, since the operating time can be reduced when replacing the filter element 40.

Figure 5:
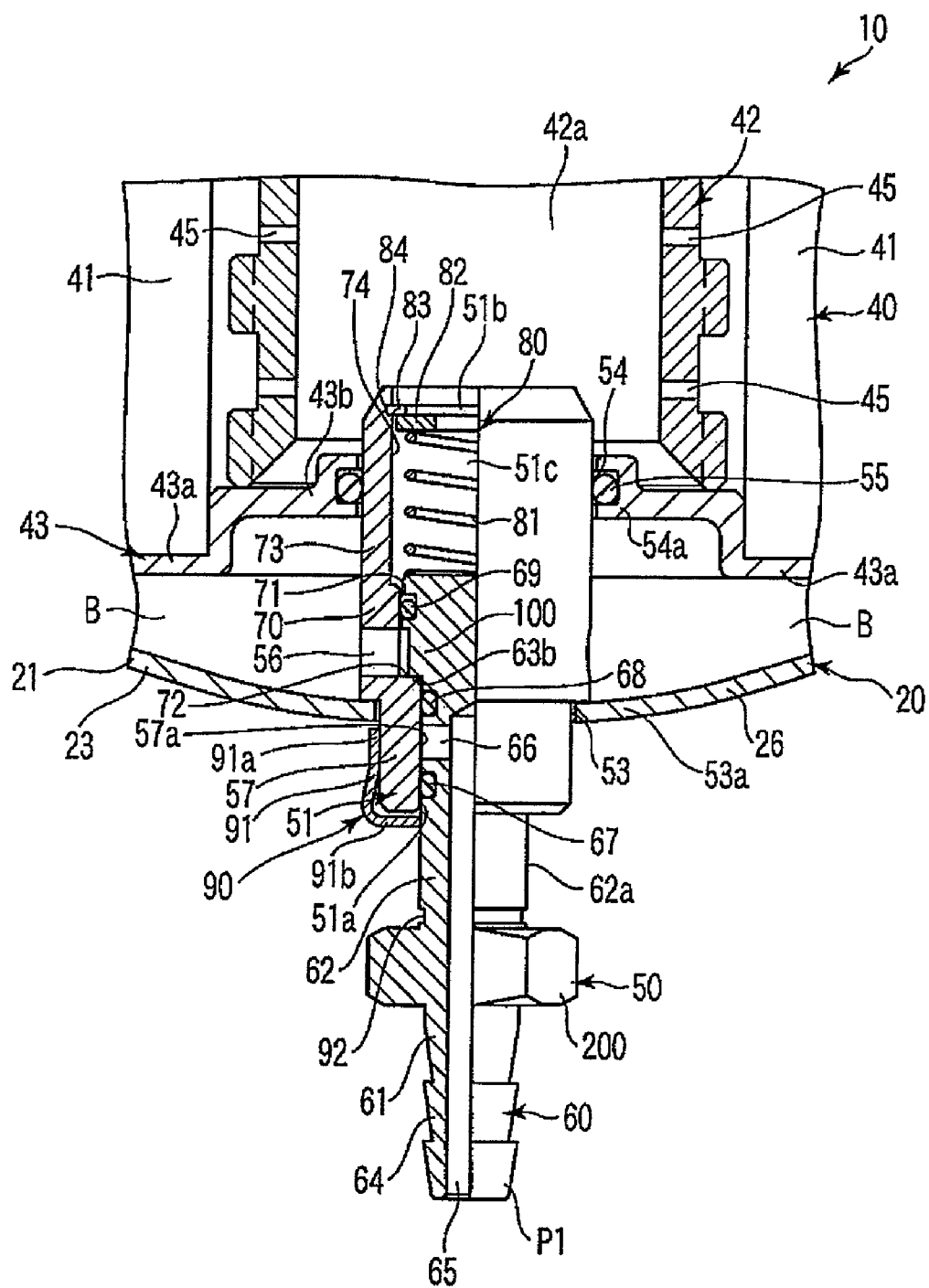
FIG. 5 is a sectional view showing an enlargement of the vicinity of the drain device of the filter device according to the second embodiment of the present invention.
Figure 6:
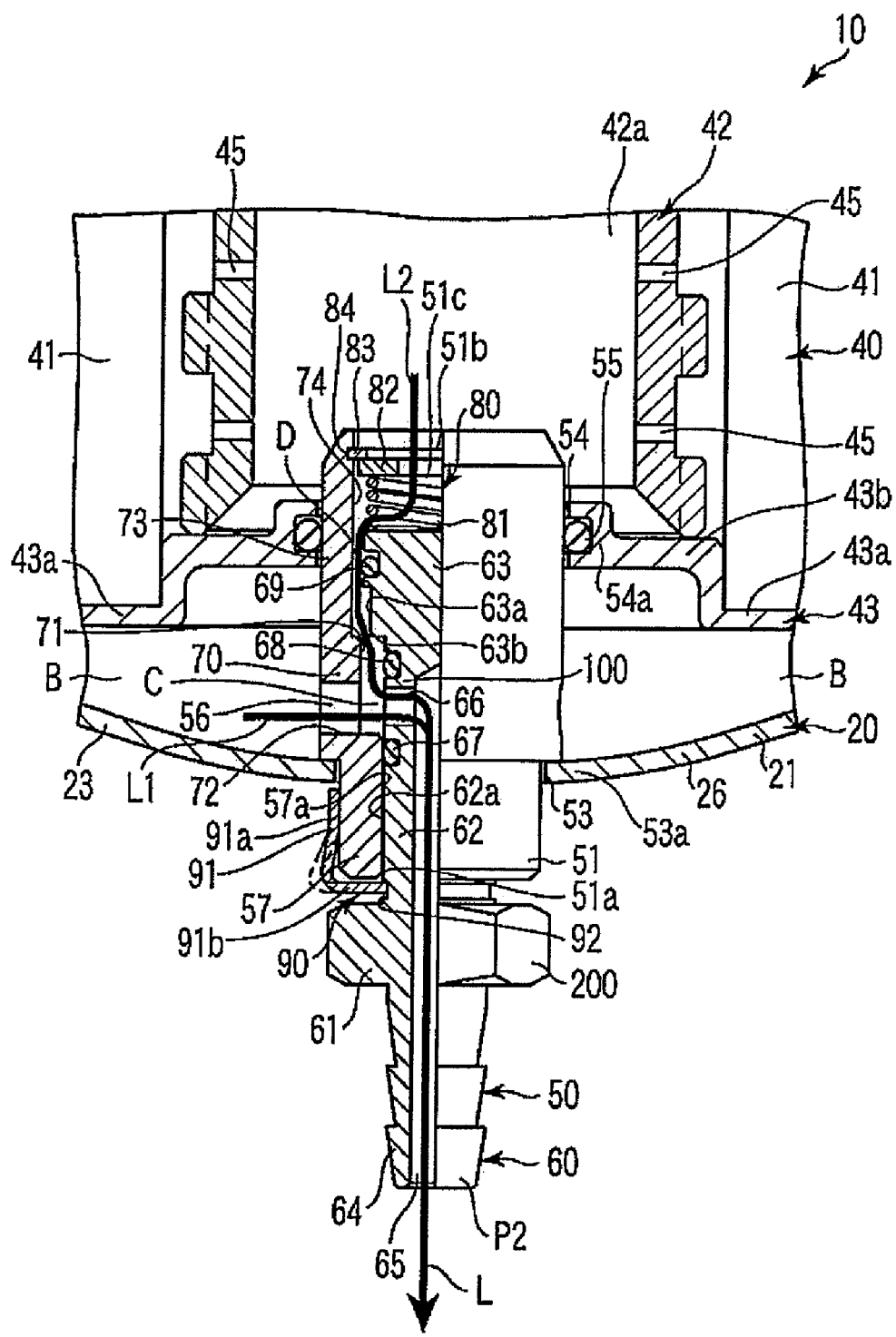
FIG. 6 is a sectional view showing an enlargement illustrating the state in which the plug shown in FIG. 5 is in the second position.

Next, a filter device 10 according to the second embodiment of the present invention is described using FIG. 5 and FIG. 6. Structures having the same functions as in the first embodiment are assigned the same reference numerals, and a description thereof is omitted.

In this embodiment, the construction of the drain device 50 differs from that of the first embodiment. In detail, the fact that the drain device 50 is provided with a positioning mechanism 80 and a holding mechanism 90 is a point that differs from the first embodiment. This point is described now in detail.

FIG. 5 is a sectional view showing an enlargement of the vicinity of the drain device 50 of the filter device 10. FIG. 5 shows the state in which the plug 60 is in the first position P1. FIG. 6 is a sectional view showing the state in which the plug 60 is in the second position P2.

As shown in FIG. 5 and FIG. 6, the drain device 50 is provided with a positioning mechanism 80. The positioning mechanism 80 is provided with a coil spring 81, a first spring support member 82, a second spring support member 83, a front end surface 63b, and a step-like gradation part 72. The coil spring 81 is an example of what is referred to in the present invention as an impelling member.

The coil spring 81 is positioned between the third part 63 and the second opening 51b. The first spring support member 82 supports the end part of the coil spring 81 on the side of the second opening 51b. The second spring support member 83 supports the first spring support member 82, and is immobilized by one part thereof engaging with a groove 84 formed on the inner periphery part of the second opening 51b.

Accordingly, the coil spring 81 is held between the first spring support member 82 and the third part 63.

Accordingly, the plug 60 is impelled by the coil spring 81 toward the first position P1. At this time, the front end surface 63b of the third part 63 and the step-like gradation part 72 of the main body 51 come into contact. That is to say, due to the fact that the plug 60 is impelled by the coil spring 81 and due to the fact that the front end surface 63b of the third part 63 and the step-like gradation part 72 of the main body 51 come into contact, the plug 60 is positioned at the first position P1. The front end surface 63b is what is referred to in the present invention as a first contact part. The step-like gradation part 72 is what is referred to in the present invention as a second contact part.

The holding mechanism 90 is provided with a holding member 91 and a groove 92. The holding member 91 has a main body unit 91a and an engaging part 91b. The main body unit 91a is immobilized on the outer periphery of the main body 51. The engaging part 91b is bent approximately in an L-shape with respect to the main body unit 91a, turning into the front end of the main body 51 and extending toward the plug 60.

The groove 92 is formed on the outer periphery of the plug 60. The engaging part 91b engages with the groove 92. As shown in FIG. 6, when the plug 60 is in the second position P2, the groove 92 is positioned so that the engaging part 91b engages with it. The plug 60 is held in the second position P2 due to the fact that the engaging part 91b engages with the groove 92.

The main body unit 91a can, for example, have flexibility, to enable the engaging part 91b to come out of the groove 92. Accordingly, when the plug 60 returns to the first position P1, the engaging part 91b is released from the groove 92, due to the fact that the main body unit 91a is caused to flex in a manner indicated by the double-dotted line in the drawing.

When the engaging part 91b comes out of the groove 92, the plug 60 is impelled toward the first position P1, by the pressure of the filtered operating oil L2 and the impulsive force of the coil spring 81.

In this embodiment the plug 60 is prevented from moving to the second position P2 when the filter device 10 is in use, due to the fact that the filter device 10 is provided with the positioning mechanism 80. Moreover, since the positioning mechanism 80 utilizes the coil spring 81, it is sufficient to simply press the plug 60 to move it to the second position P2. Accordingly, the efficiency of discharging the operating oil L1 and L2 is enhanced.

Furthermore, the efficiency of discharging the operating oil L1 and L2 is enhanced since the plug 60 can be held at the second position P2 due to the fact that the filter device is provided with the holding mechanism 90.

In addition, the cost of the filter device 10 can be kept down, since the holding mechanism 90 is a simple structure that uses the holding member 91 and the groove 92.

A filtered device according to the third embodiment of the present invention is described below, using FIG. 7 to FIG. 9. Structures having the same functions as in the second embodiment are assigned the same reference numerals, and a description thereof is omitted. In this embodiment, the construction of the drain device 50 differs from that of the second embodiment. Other structures may be identical to the second embodiment. Following is a detailed description of the structures that differ.

Figure 7:
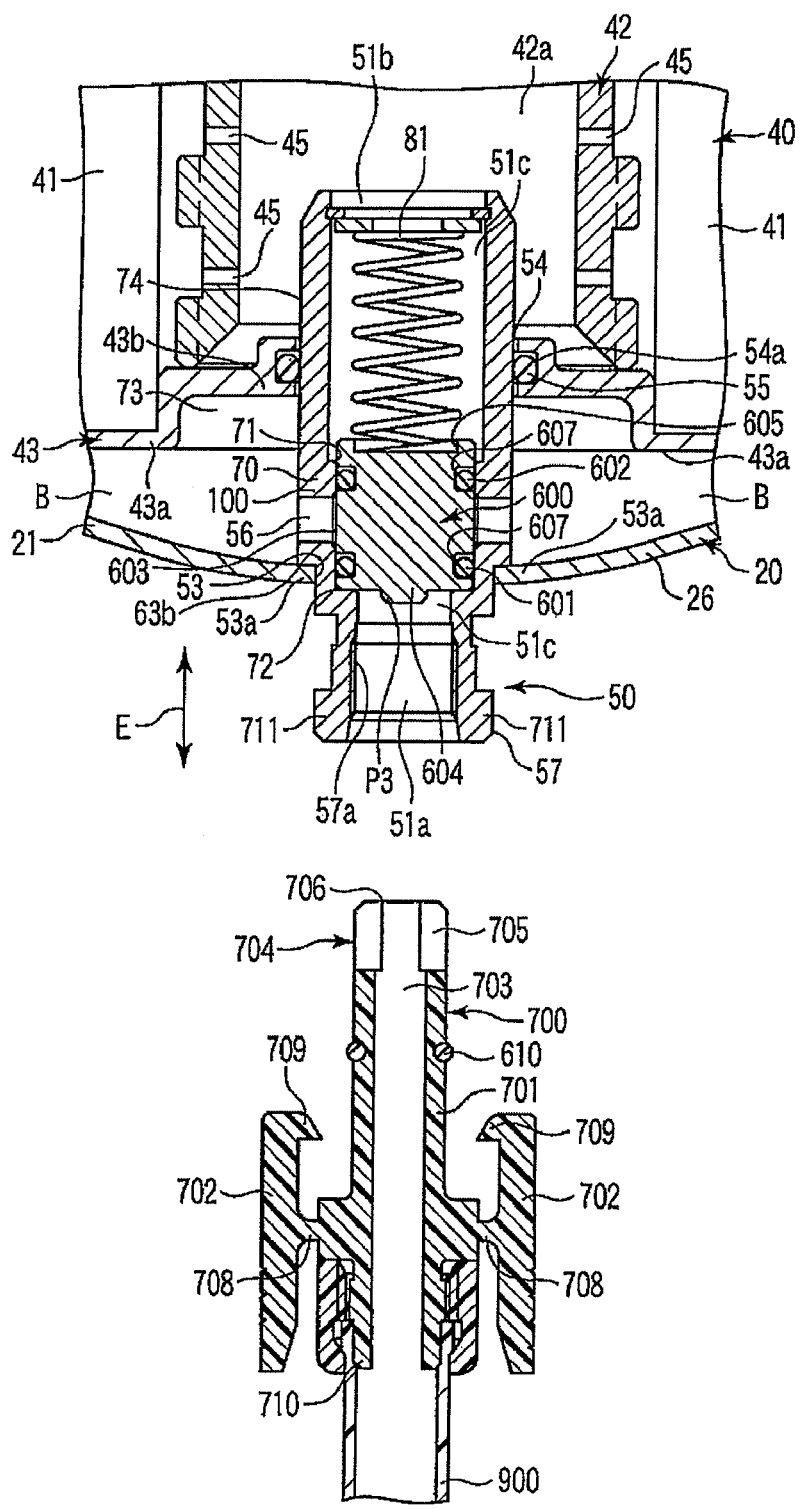
FIG. 7 is a sectional view showing an enlargement of the vicinity of the drain device of a device according to the third embodiment of the present invention.
Figure 8:
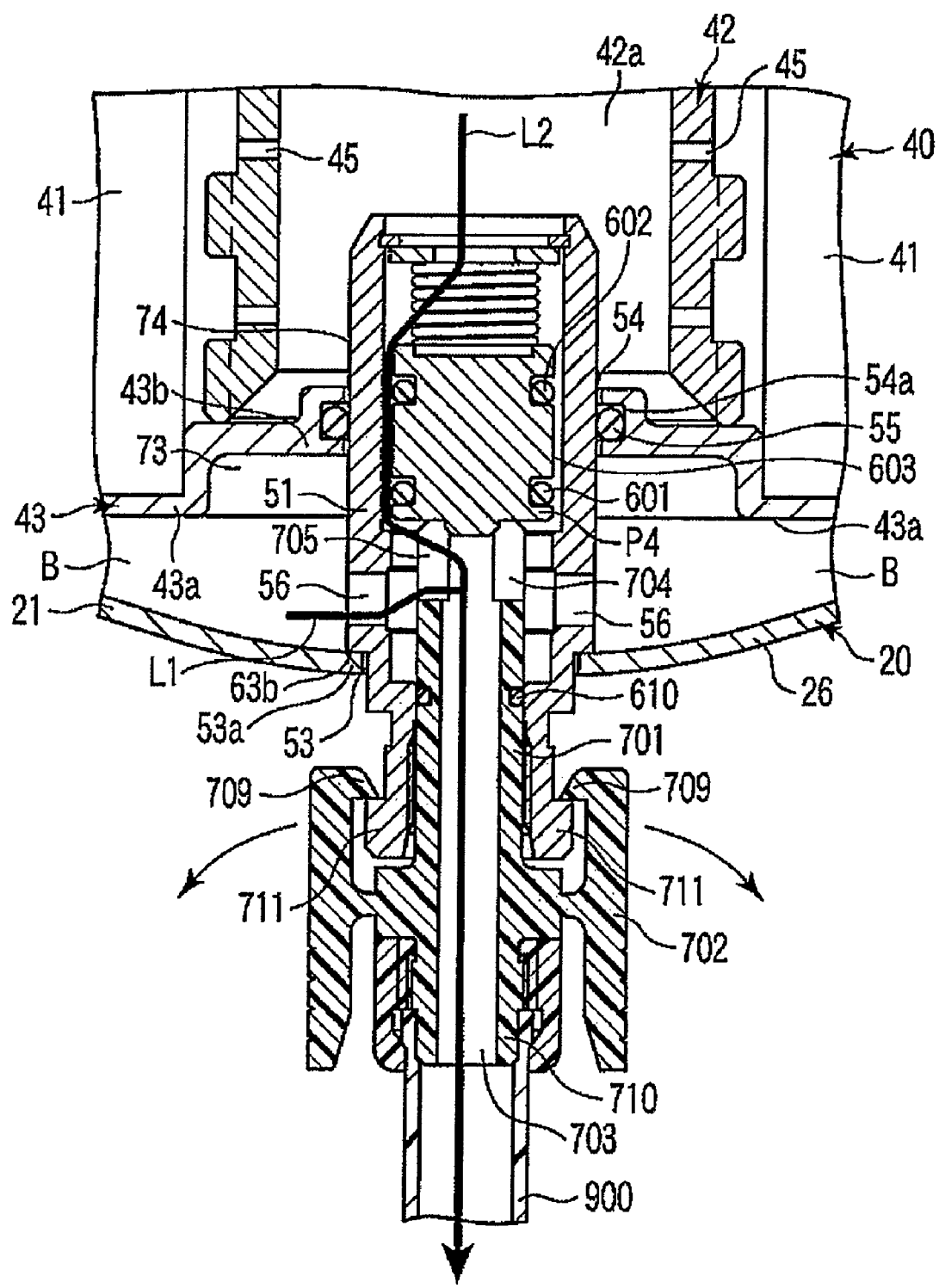
FIG. 8 is a sectional view of the state in which the inserted member shown in FIG. 7 is inserted so that the held member reaches the discharge position.

FIG. 7 is a sectional view showing an enlargement of the vicinity of the drain device 50 of this embodiment. As shown in FIG. 7, instead of using the plug 60 described in the second embodiment, the drain device 50 is provided with a held member 600 and an inserted member 700.

The held member 600 is held in the first channel 51c. The held member 600 has the function of fluid-tightly covering the third opening 56. In detail, the held member 600 is movable between a non-discharge position P3 to fluid-tightly cover the third opening 56, and a discharge position P4 (shown in FIG. 8) to open the third opening 56.

Following is a detailed description of the configuration of the held member 600. The held member 600 is approximately cylindrical, and is of a size that can be held between the step-like gradation part 72 and the second opening 51b. When the front end of the held member 600 makes contact with the step-like gradation part 72, the third opening 56 is fluid-tightly sealed by the side surface of the held member 600. This position is the non-discharge position P3.

Furthermore, the held member 600 has a size sufficient to move from the non-discharge position P3 toward the second opening 51b, until the third opening 56 opens, that is to say, the front end of the held member 600 moves to a position more on the side of the second opening 51b than the third opening 56. The position at which the held member 600 moves to the side of the second opening 51b until the third opening 56 opens is the discharge position P4 shown in FIG. 8.

O-rings 601 and 602 are provided on the side wall of the held member 600. In detail, annular holding grooves 607 are located along the direction of motion E of the held member 600, shown by the arrows in the drawing, such that they have the third opening 56 between them when the held member 600 is at the non-discharge position P3. The O-rings 601 and 602 are held in the holding grooves 607. The holding grooves 607 have the same configuration. The O-rings 601 and 602 are mutually identical.

A side surface 603 of the held member 600 is parallel to the direction of motion E. Accordingly, the inner periphery surface 71 of the center part 70 of the main body 51 is also formed parallel to the direction of motion E.

When the held member 600 is in the non-discharge position P3, the first and third openings 51a and 56 are fluid-tightly sealed, due to the fact that the O-rings 601 and 602 make contact with the inner periphery surface 71 of the center part 70. In this embodiment, the held member 600 and the O-rings 601 and 602 form what is referred to in the present invention as the seal structure 100.

A protruding part 604, which protrudes toward the first opening 51a, is formed at the front end part on the first opening 51a side in the held member 600. The protruding part 604 is, for example, approximately cylindrical in shape, and is positioned coaxially with the axial line of the held member 600. When the held member 600 is in the non-discharge position P3, the protruding part 604 has a size that does not protrude to the outer side from the first opening 51a.

A holding groove 605, which holds the end part of the coil spring 81 of the positioning mechanism 80, is formed on the end part of the second opening 51b in the held member 600. The held member 600 is impelled by the coil spring 81 toward the first opening 51a to make contact with the step-like gradation part 72, and as a result, it is positioned at the non-discharge position P3.

The inserted member 700 is removably inserted from the first opening 51a into the first channel 51c. The inserted member 700 is provided with an inserted member main body unit 701 and a handle 702.

The inserted member main body unit 701 is, for example, cylindrical in shape and made from a resin, and is inserted into the first channel 51c. FIG. 8 is a sectional view of the state in which the inserted member main body unit 701 is inserted into the first channel 51c. As shown in FIG. 8, the inserted member main body unit 701 is of a size that approximately engages into the first channel 51c. An O-ring 610, which serves as a seal member forming a fluid-tight seal between the inserted member main body unit 701 and the main body 51, is formed in the vicinity of the center of the inserted member main body unit 701.

Figure 9:
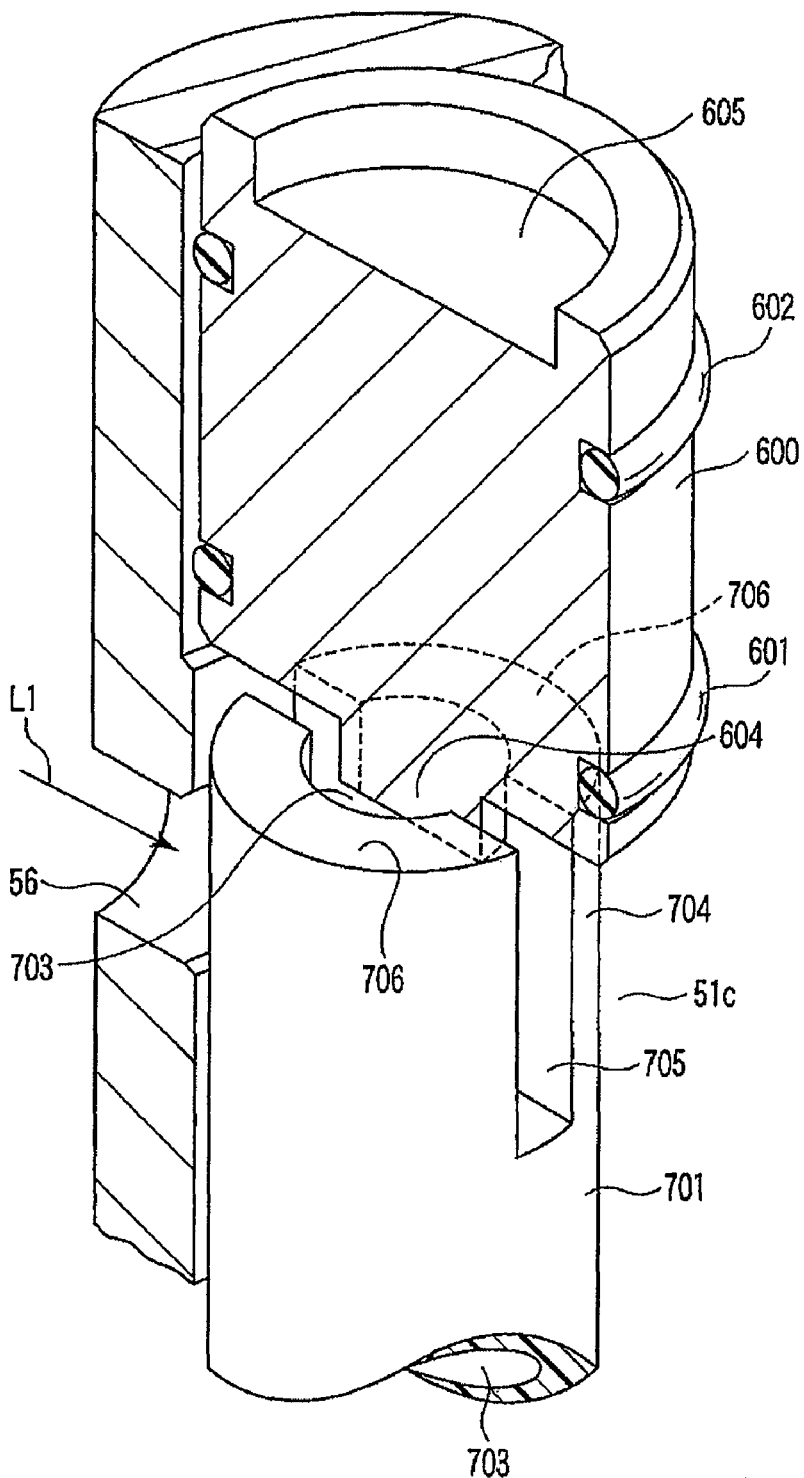
FIG. 9 is an oblique cut-away view of the state within the first channel when the inserted member is inserted in the first channel.

FIG. 9 is an oblique cut-away view of the state within the first channel 51c when the inserted member main body unit 701 is inserted in the first channel 51c. As shown in FIG. 8 and FIG. 9, a third channel 703, which passes through the inserted member main body unit 701, is formed inside the inserted member main body unit 701. The third channel 703 is what is referred to in the present invention as a channel.

The size of the third channel 703 in an insertion tip 704 of the inserted member main body unit 701 is large enough on the inner side to enable the protruding part 604 of the held member 600, for example, to engage. Furthermore, a groove 705 is formed in the insertion tip 704 of the inserted member main body unit 701. The groove 705 passes through the inserted member main body unit 701 in a direction cutting across the axial line of the inserted member main body unit 701. The groove 705 communicates with the third channel 703.

When the inserted member main body unit 701 is inserted into the first channel 51c, a front end surface 706 of the inserted member main body unit 701 comes into contact with the held member 600. At this time, the protruding part 604 of the held member 600 engages with the third channel 703.

Moreover, when the inserted member main body unit 701 is pushed into the first channel 51c, the held member 600 moves from the non-discharge position P3 to the discharge position P4. When the held member 600 moves to the discharge position P4, the operating oil L1 to be filtered flows in through the third opening 56, and the filtered operating oil L2, penetrate into the third channel 703 via the groove 705.

As shown in FIG. 7, the handle 702 is provided, for example, as a pair. The handles 702 extend approximately along the inserted member main body unit 701, and are, for example, in the shape of a plate. The handles 702 are positioned facing each other, with the inserted member main body unit 701 disposed between them, and are connected to the inserted member main body unit 701 via a linking part 708.

The linking part 708 is formed, for example, so as to be relatively narrow, and is able to flex. Accordingly, the handle 702 can rotates around the linking part 708. As shown in FIG. 7 and FIG. 8, the inserted member main body unit 701, the linking parts 708, and the handles 702, may be formed integrally with each other. Or, they can be formed separately from each other, and may, for example, be attached with an adhesive. In other words, it suffices if these parts are integrated together.

A first engaging protruding part 709, which protrudes toward the inserted member main body unit 701, is formed on the front end part of the handle 702. Furthermore, a second engaging protruding part 711, with which the first engaging protruding part 709 engages when the inserted member main body unit 701 is inserted until it reaches the discharge position P4, is formed on the side wall of the main body 51.

An attaching part 710, to which is attached a tube member 900 for discharging the operating oil, is formed at the end on the side opposite from the insertion tip 704, with the linking part 708 disposed between them, in the inserted member main body unit 701.

In the case of the filter device 10 constructed in such a manner, when the housing main body 21 is removed from the head 30, for example, when the filter element 40 is replaced, the inserted member 700 is inserted from the first opening 51a into the first channel 51c. Also, the inserted member 700 is pushed in until the first engaging protruding part 709 engages with the second engaging protruding part 711. As a result, the held member 600 within the first channel 51c moves from the non-discharge position P3 to the discharge position P4.

Accordingly, the filtered operating oil L2 remaining in the inner side 42a of the inner cylinder 42 and the operating oil L1 that is to be filtered and that remains in the space B are simultaneously discharged to outside of the housing 20.

Furthermore, when discharge of the filtered operating oil L2 remaining in the inner side 42a of the inner cylinder 42 and the operating oil L1 that is to be filtered and that remains in the space B is completed, one grabs the end of the handle 702 on the side opposite to the first engaging protruding part 709. Accordingly, the handle 702 opens, as shown by the arrow in FIG. 8, due to the flexing of the linking part 708. As a result, the engagement between the first engaging protruding part 709 and the second engaging protruding part 711 is released. When the engagement between the first engaging protruding part 709 and the second engaging protruding part 711 is released, the inserted member 700 is extracted from the main body 51.

When the inserted member 700 comes out of the main body 51, the held member 600 moves from the discharge position P4 to the non-discharge position P3, due to the impulsive force of the coil spring 81. Accordingly, the first opening 51a is fluid-tightly sealed.

In this embodiment, the inserted member 700 is detached, except for when it is time to discharge the filtered operating oil L2 remaining in the inner side 42a of the inner cylinder 42 and the operating oil L1 that is to be filtered and that remains in the space B. Thus, the held member 600 is prevented from unexpectedly moving to the discharge position P4. In other words, the filtered operating oil L2 remaining in the inner side 42a of the inner cylinder 42 and the operating oil L1 that is to be filtered and that remains in the space B is prevented from being discharged unexpectedly.

Moreover, the operating oil L1 that is to be filtered is prevented from being discharged while being filtered. This point is now explained in detail. When the held member 600 is at the non-discharge position P3, the pressure of the operating oil L1 that is to be filtered and that passes through the third opening 56 and remains in the space B operates on the area between the O-rings 601 and 602 on the side surface 603 of the held member 600.

The pressure of the filtered operating oil L2 remaining in the inner side 42a of the inner cylinder 42, as well as the impulsive force of the coil spring 81, operate on the front end surface of the holding groove 605 in the held member 600. Typically, the pressure of the operating oil L1 that is to be filtered and that remains in the space B is greater than the pressure of the filtered operating oil L2 remaining in the inner side 42a of the inner cylinder 42.

On the other hand, the space between the O-rings 601 and 602 in the side surface 603 of the held member 600 is parallel to the direction of motion E. Moreover, the holding grooves 607 have the same configuration, and the position of the O-ring 601 and the position of the O-ring 602 run parallel to the direction of motion E.

In the held member 600, the holding groove 607 is the only site that receives the pressure of the operating oil L1 that is to be filtered and that remains in the space B in the direction of motion E. However, since the configuration of these holding grooves 607 are identical, the loads operating in the direction of motion E cancel each other out, even if the pressure of the operating oil L1 operates on the holding groove 607.

As a result, even in the unlikely event that the pressure of the operating oil L1 that is to be filtered and that remains in the space B rises, the held member 600 is prevented from moving from the non-discharge position P3 to the discharge position P4 by the pressure of the operating oil L1. Thus, the operating oil L1 that is to be filtered is prevented from being discharged while it is being filtered.

Figure 10:
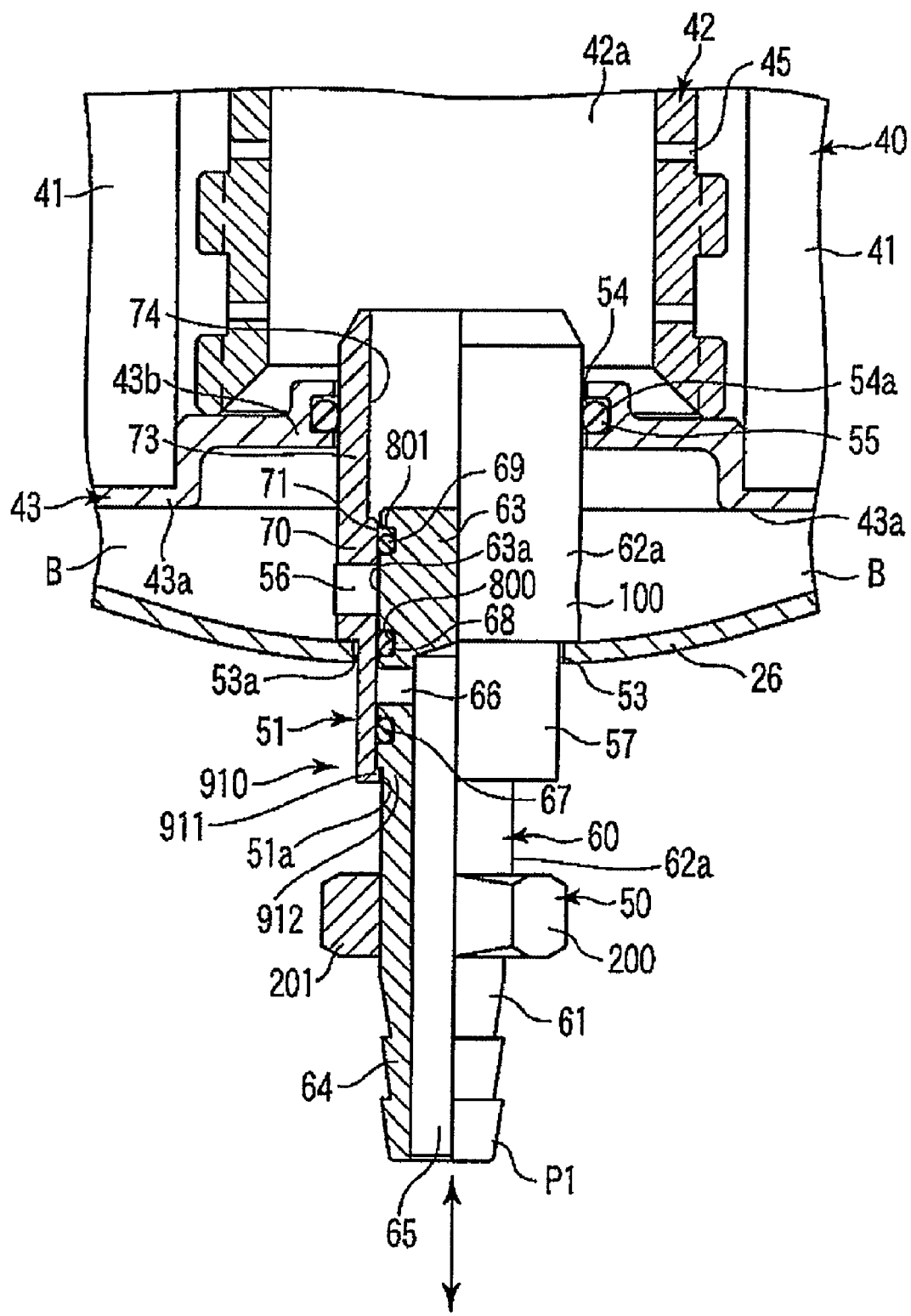
FIG. 10 is a sectional view showing an enlargement of the vicinity of the drain device of a filter device according to the fourth embodiment of the present invention.

Following is a description of the filter device 10 according to a fourth embodiment of the present invention, using FIG. 10. Structures having the same functions as in the first embodiment are assigned the same reference numerals, and a description thereof is omitted. In this embodiment, the shape of the plug 60 differs from that of the first embodiment. Other structures may be identical to the first embodiment.

Now follows a detailed explanation regarding this point of difference. In this embodiment, a portion of the outer periphery surface 62a of the second part 62 and the outer periphery surface 63a of the third part 63 form a continuous surface parallel to the direction of motion F of the plug 60. In other words, the cross-sectional shape of the second part 62 and the cross-sectional shape of the third part 63 are identical. Moreover, the shapes of the grooves 800 and 801 that hold the O-rings 68 and 69 are also mutually identical. Thus, the O-rings 68 and 69 are identical with each other.

In this embodiment, a detachment preventing mechanism 910 is provided to prevent the plug 60 from coming out of the main body 51. The detachment preventing mechanism 910 is provided with a detachment preventing protrusion 911 disposed on the inner edge of the first opening 51a of the main body 51.

The detachment preventing protrusion 911 is disposed on the inner edge of the first opening 51a, for example, along the entire circumference of it, protruding toward the inner side.

Regarding the surrounding wall of the second part 62 of the plug 60, when the plug 60 is at the first position P1, the size of the area from the site 912 facing the detachment preventing protrusion 911 to the front end of the plug 60 is slightly smaller than the inner diameter of the detachment preventing protrusion 911 (the diameter of the inner edge of the detachment preventing protrusion 911).

Furthermore, regarding the surrounding wall of the plug 60, when the plug 60 is at the first position P1, the area from the site 912 facing the detachment preventing protrusion 911 to the opposite end is greater than the inner diameter of the detachment preventing protrusion 911.

A stopper part 200 is formed by providing a separately formed stopper member 201 provided integrally, for example, by screwing it into the plug 60.

Accordingly, when the stopper member 201 is removed, and the plug 60 is inserted from the inner side of the housing 20, the detachment preventing protrusion 911 catches onto the site 912 of the plug 60. After the plug 60 is contained in the main body 51, it is attached to the plug 60.

In this embodiment, in addition to the advantageous effects of the first embodiment, the operating oil L1 that is to be filtered is prevented from being discharged while it is being filtered. This point will now be explained in detail. When the plug 60 is in the first position P1 the pressure of the operating oil L1 that is to be filtered and that passes through the third opening 56 and remains in the space B operates between the O-rings 68 and 69 in the outer periphery surface 63a of the plug 60.

The pressure of the filtered operating oil L2 remaining in the inner side 42a of the inner cylinder 42 operates on the end surface of the second opening 51b in the plug 60. Typically, the pressure of the operating oil L1 that is to be filtered and that remains in the space B is greater than the pressure of the filtered operating oil L2 remaining in the inner side 42a of the inner cylinder 42.

However, the O-rings 68 and 69 on the outer periphery surface 63a of the plug 60 are parallel to the direction of motion F of the plug 60. Moreover, the shapes of the grooves 800 and 801 are identical, and run parallel to the positions of the O-ring 68 and the O-ring 69 in the direction of motion F.

The grooves 800 and 801 are the only sites on the plug 60 that receive in the direction of motion F the pressure of the operating oil L1 that is to be filtered and that remains in the space B, but since these grooves 800 and 801 are of the same shape, the loads operating in the direction of motion F cancel each other out, even if the pressure of the operating oil L1 operates on the grooves 800 and 801.

As a result, even in the unlikely event that the pressure of the operating oil L1 that is to be filtered and that remains in the space B rises, the plug 60 is prevented from moving from the first position P1 to the second position P2 by the pressure of the operating oil L1. Thus, the operating oil L1 that is to be filtered is prevented from being discharged while it is being filtered.

The same advantageous effects are obtained if the same technology of this embodiment is incorporated into the plug 60 of the second embodiment.

Next, a filter device according to a fifth embodiment is described using FIG. 11-19. Structures having the same functions as in the first embodiment are assigned the same reference numerals, and a description thereof is omitted. This embodiment differs from the first embodiment in that the filter device 10 is further provided with a vent valve device 1050. Other structures may be identical to the first embodiment. Following is a description of the points that differ.

Figure 11:
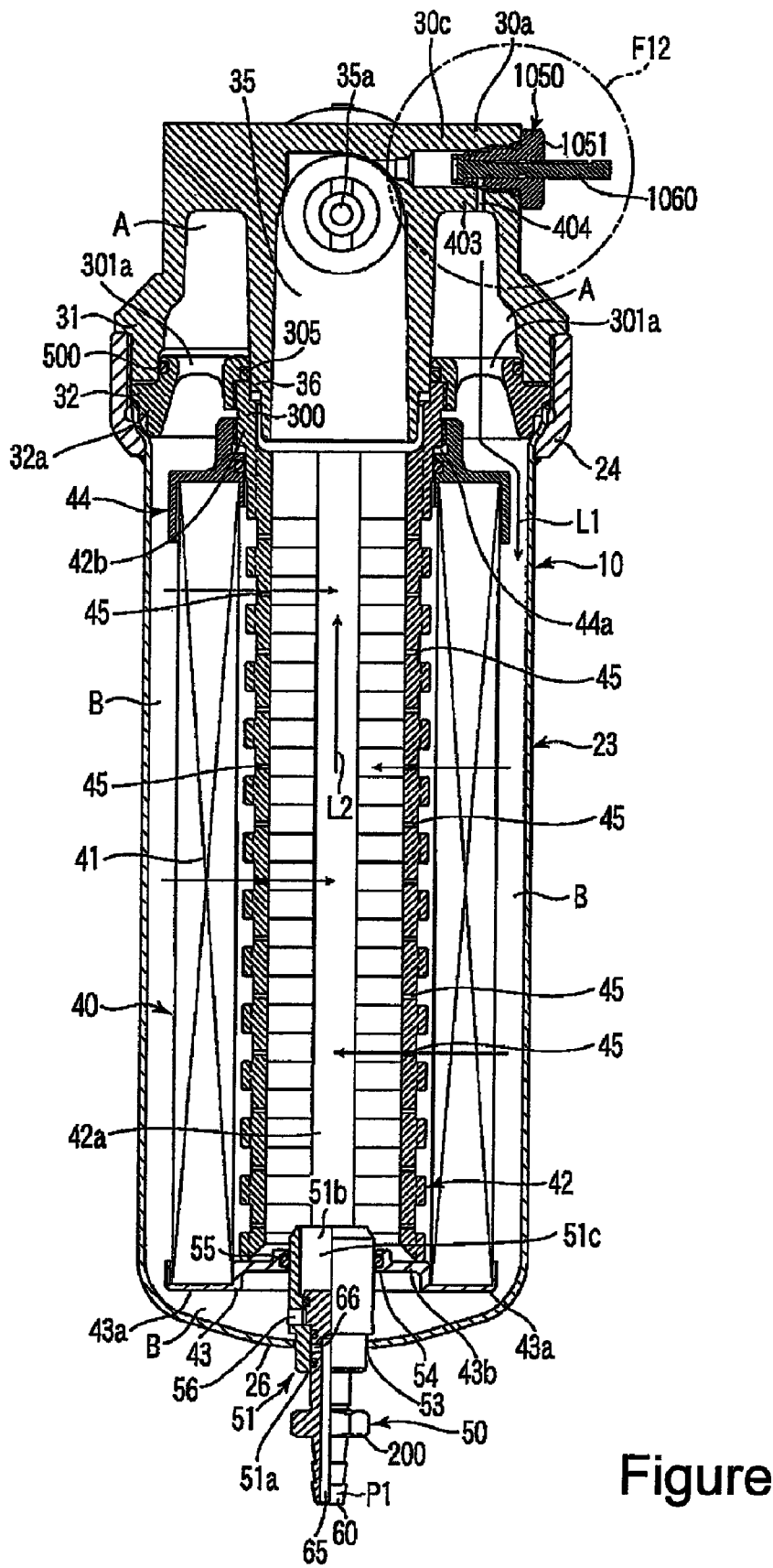
FIG. 11 is a sectional view of a filter device according to the fifth embodiment.
Figure 12:
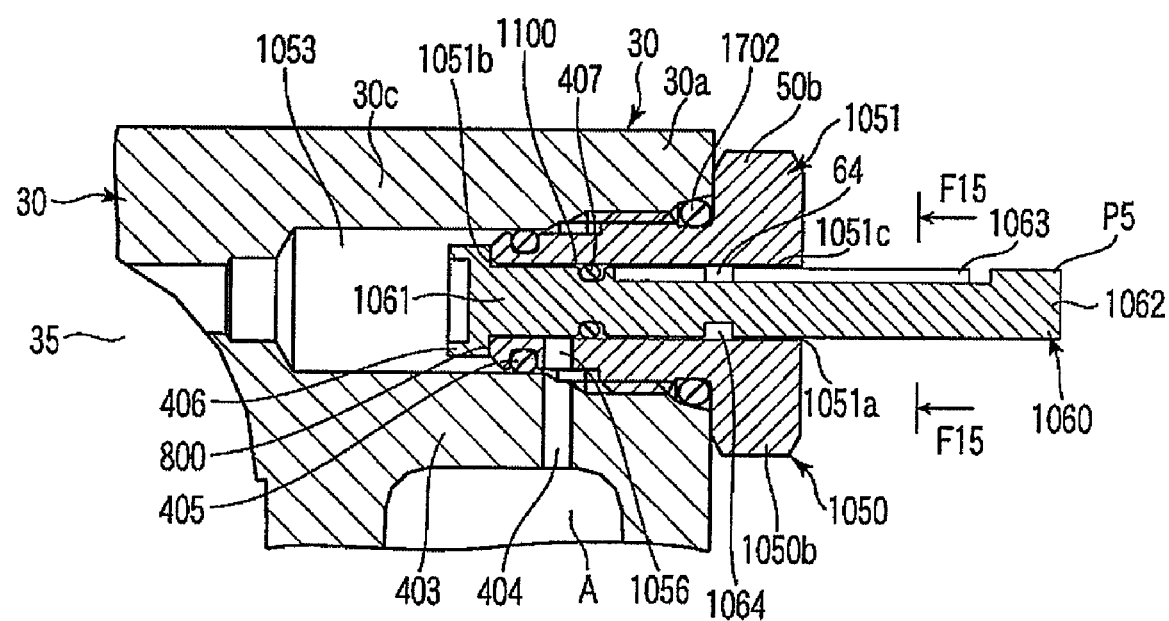
FIG. 12 is a sectional view of an enlargement of the area F12 shown in FIG. 11.

FIG. 11 is a sectional view of the filter device 10 of this embodiment. As shown in FIG. 11, the vent valve device 1050 is disposed at the upper end part 30a of the head 30. FIG. 12 is a sectional view of an enlargement of the area F12 shown in FIG. 11. As shown in FIG. 12, the vent valve device 1050 is provided with a vent valve device main body 1051 and a vent valve device plug 1060.

Figure 13:
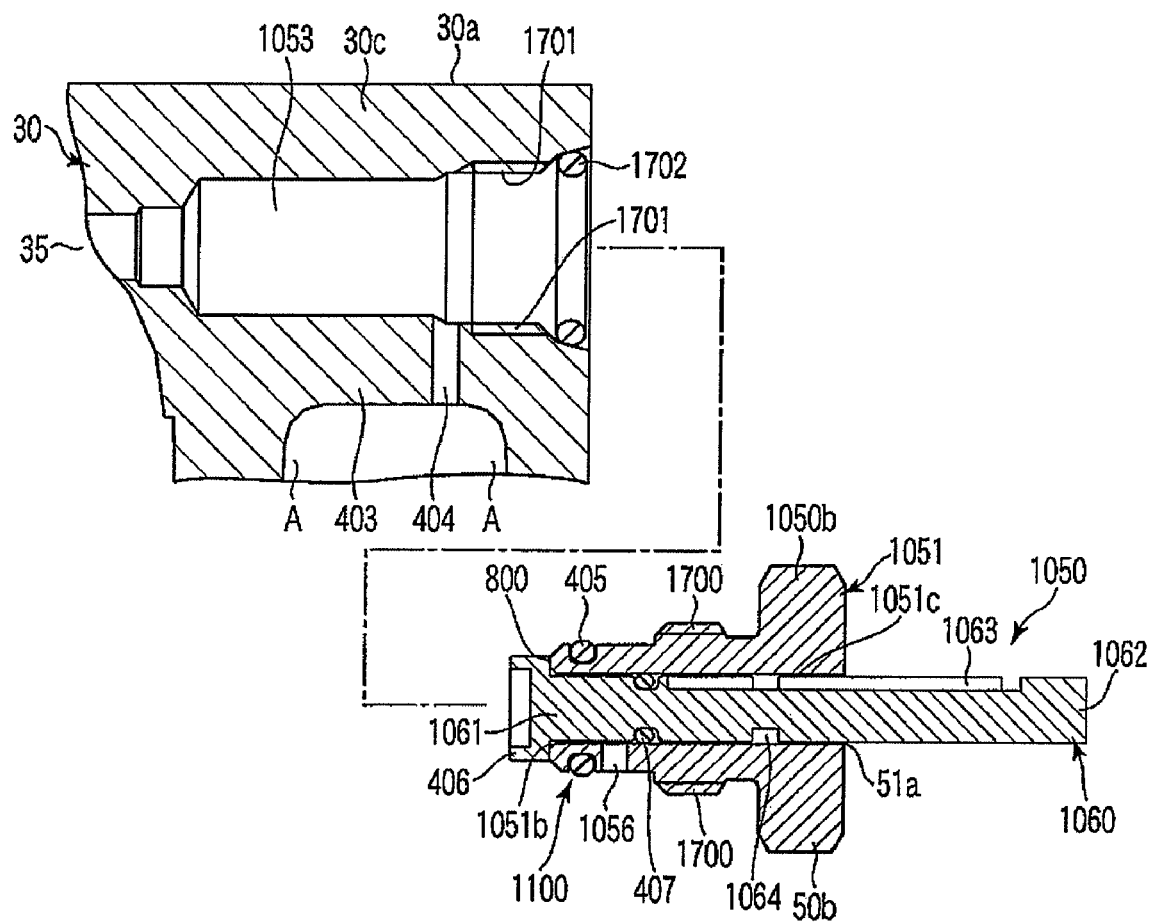
FIG. 13 is a sectional view in which the vent valve device shown in FIG. 12 has been disassembled.

FIG. 13 is a sectional view in which the vent valve device 1050 has been disassembled. As shown in FIG. 13, the vent valve device main body 1051 is a cylindrical member. The vent valve device main body 1051 extends from the outer side of the head 30 to the inner side of the outlet 35. A retaining hole 1053, in which the vent valve main body 1051 is retained, is formed on the upper wall 30c of the head 30. The retaining hole 1053 passes through the upper wall 30c of the head 30, from the outer side to the inner side of outlet 35.

Accordingly, the retaining hole 1053 is separated from the space A by a separating wall 403. A pore 404 is formed in the separating wall 403. The pore 404 passes through the separating wall 403 and communicates with the retaining hole 1053 and the space A.

A latch part 1050b is formed at the tip of the vent valve device main body 1051. The latch part 1050b sticks out from the retaining hole 1053 when the vent valve device main body 1051 is held in the retaining hole 1053. The latch part 1050b extends in the circumferential direction of the vent valve device main body 1051. Accordingly, the cross-sectional shape of the vent valve device main body 1051 is approximately the shape of the letter T, as shown in the drawings.

A male screw part 1700 is formed on the outer periphery of the site that is held within the retaining hole 1053 in the vent valve device main body 1051. A female screw part 1701 is formed on the open end side on the inner periphery of the retaining hole 1053. The vent valve device main body 1051 is held in the retaining hole 1053 up to the point where the latch part 1050b touches the outer periphery of the head 30, and is affixed to the head 30 due to the fact that the male screw part 1700 is screwed into the female screw part 1701.

An O-ring 1702 is disposed at a position that stays clear of the female screw part 1701, in the vicinity of the open end in the inner periphery of the retaining hole 1053. As shown in FIG. 12, the O-ring 1702 forms an air-tight seal between the inner periphery surface of the retaining hole 1053 and the outer periphery surface of the vent valve device main body 1051. The other end (insertion end) of the vent valve device main body 1051 extends up to a position that covers the pore 404.

A first vent valve device opening 1051a, which is one opening of the vent valve device main body 1051, opens to the outer side of the head 30. A second vent valve device opening 1051b, which is another opening of the vent valve device main body 1051, opens to inside of the retaining hole 1053. The first vent valve device opening 1051a and the second vent valve device opening 1051b communicate with each other. The inner side of the vent valve device main body 1051 functions as a vent valve device channel 1051c. The vent valve device channel 1051c is what is referred to in the present invention as a first vent valve device channel.

Accordingly, the outlet 35, that is to say, the inner side 42a of the inner cylinder 42, communicates with the outer side of the housing 20 via second vent valve device opening 1051b, the vent valve device channel 1051c, and the first vent valve device opening 1051a.

A third vent valve device opening 1056 is formed in the vent valve device main body 1051, in a position facing the pore 404. An O-ring 405 is provided to the outer periphery of the vent valve device main body 1051 between the other end (the opposite end of the latch part 1050*b*) and the third vent valve device opening. The O-ring 405 forms an air-tight seal between the inner surface of the retaining hole 1053 and the outer periphery surface of the vent valve device main body 1051.

The third vent valve device opening 1056 communicates with the vent valve device channel 1051*c*. Accordingly, the space A communicates with the vent valve device channel 1051*c* via the pore 404 and the third vent valve device opening 1056.

The vent valve device plug 1060 extends in one direction, and slidably engages with the vent valve device channel 1051*c* of the vent valve device main body 1051.

One end part 1061 of the vent valve device plug 1060 goes into the retaining hole 1053 through the vent valve device channel 1051*c*. A latch part 406, which is able to touch the edge part of the second vent valve device opening 1051*b*, is formed on the end part 1061. The latch part 406 extends in the circumferential direction of the vent valve device plug 1060. The vent valve device plug 1060 is not able to exit to the outer side of the housing 20 via the inside of the vent valve device channel 1051*c*, since the latch part 406 makes contact with a second vent valve device opening side end surface 800 positioned on the side of the second vent valve device opening 1051*b* in the vent valve device main body 1051.

When the latch part 406 makes contact with the edge part of the second vent valve device opening 1051*b*, an O-ring 407 is provided on the side of the first vent valve device opening 1051*a* rather than the third vent valve device opening 1056 at the outer periphery of the vent valve device main body 1051. The O-ring 407 forms an air-tight seal between the inner periphery surface of the vent valve device main body 1051 (channel 1051*c*) and the outer periphery surface of the vent valve device plug 1060.

Figure 15:
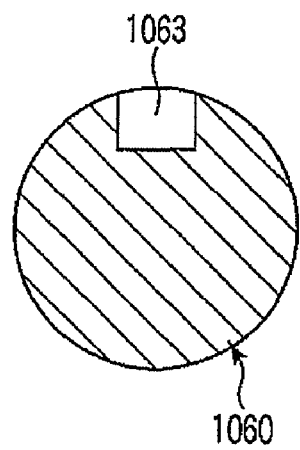
FIG. 15 is a sectional view of a vent valve device along the line F15-F15 shown in FIG. 12.

A first groove 1063 is formed on the side of the other end 1062 from the O-ring 407 in the outer periphery of the vent valve device main body 1051. The first groove 1063 extends, for example, along the sliding direction of the vent valve device plug 1060. FIG. 15 is a sectional view along the line F15-F15 in FIG. 12. FIG. 15 shows the first groove 1063.

As shown in FIG. 12 and FIG. 13, a second groove 1064 is formed in the vent valve device main body 1051, on the other end side 1062 from the O-ring 407. The second groove 1064 is formed annularly in the circumferential direction of the vent valve device main body 1051. The first groove 1063 and the second groove 1064 intersect each other.

The vent valve device plug 1060 can slide within the retaining hole 1053, between a vent valve device non-discharge position P5 and a vent valve device discharge position P6.

The vent valve device non-discharge position P5 is a position at which air or other gas in the housing 20 is not discharged to the outer side of the housing 20. To explain in detail, the vent valve device non-discharge position P5 is a state in which the latch part 406 touches the edge part of the second vent valve device opening 1051*b*, as shown in FIG. 12.

Air or other gas remaining in the spaces A and B and in the outlet 35 is not discharged to outside of the housing 20, when the vent valve device plug 1060 is at the vent valve device non-discharge position P5, because the vent valve device channel 1051*c* is air-tightly sealed by the inner surface of the vent valve device channel 1051*c* and the O-ring 407.

Furthermore, when the vent valve device plug 1060 is at the vent valve device non-discharge position P5, the second vent valve device opening 1051*b* is air-tightly sealed due to the fact that the latch part 406 makes contact with the second vent valve device opening 1051*b*, and the third vent valve device opening 1056 is approximately air-tightly sealed by the outer periphery surface of the vent valve device plug 1060 and the O-rings 405 and 407. Accordingly, an air-tight seal is formed between the second vent valve device opening 1051*b* and the third vent valve device opening 1056.

Therefore, the O-ring 407 and the inner surface of the vent valve device channel 1051*c*, and the vent valve device plug 1060 and the latch part 406 form what is referred to in the present invention as a vent valve device seal structure 1100.

Figure 14:
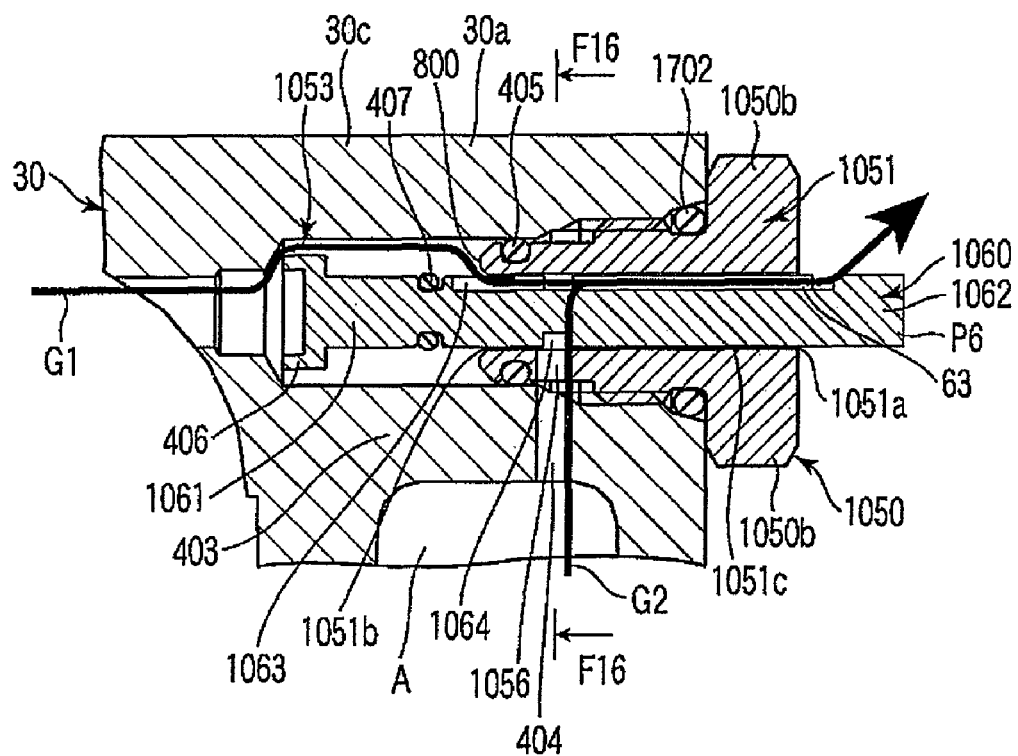
FIG. 14 is a sectional view of a vent valve device showing the state in which the plug shown in FIG. 12 is at the vent valve device discharge position.

FIG. 14 is a sectional view of the vent valve device 1050 showing the state in which the vent valve device plug 1060 is at the vent valve device discharge position P6. As shown in FIG. 14, the vent valve device discharge position P6 is a position at which a gas such as air is discharged from the housing 20.

The vent valve device discharge position P6 is a position at which the second groove 1064 faces the third vent valve device opening 1056. Following is a detailed explanation regarding the length of the first groove 1063.

When the vent valve device plug 1060 is in the vent valve device discharge position P6, the first groove 1063 extends so that one end exits the vent valve device channel 1051*c* and communicates with the retaining hole 1053. Moreover, when the vent valve device plug 1060 is in the vent valve device discharge position P6, the first groove 1063 extends so that its other end communicates with the outer side of the head 30, that is, so that it exits to the outer side of the head 30.

Figure 16:
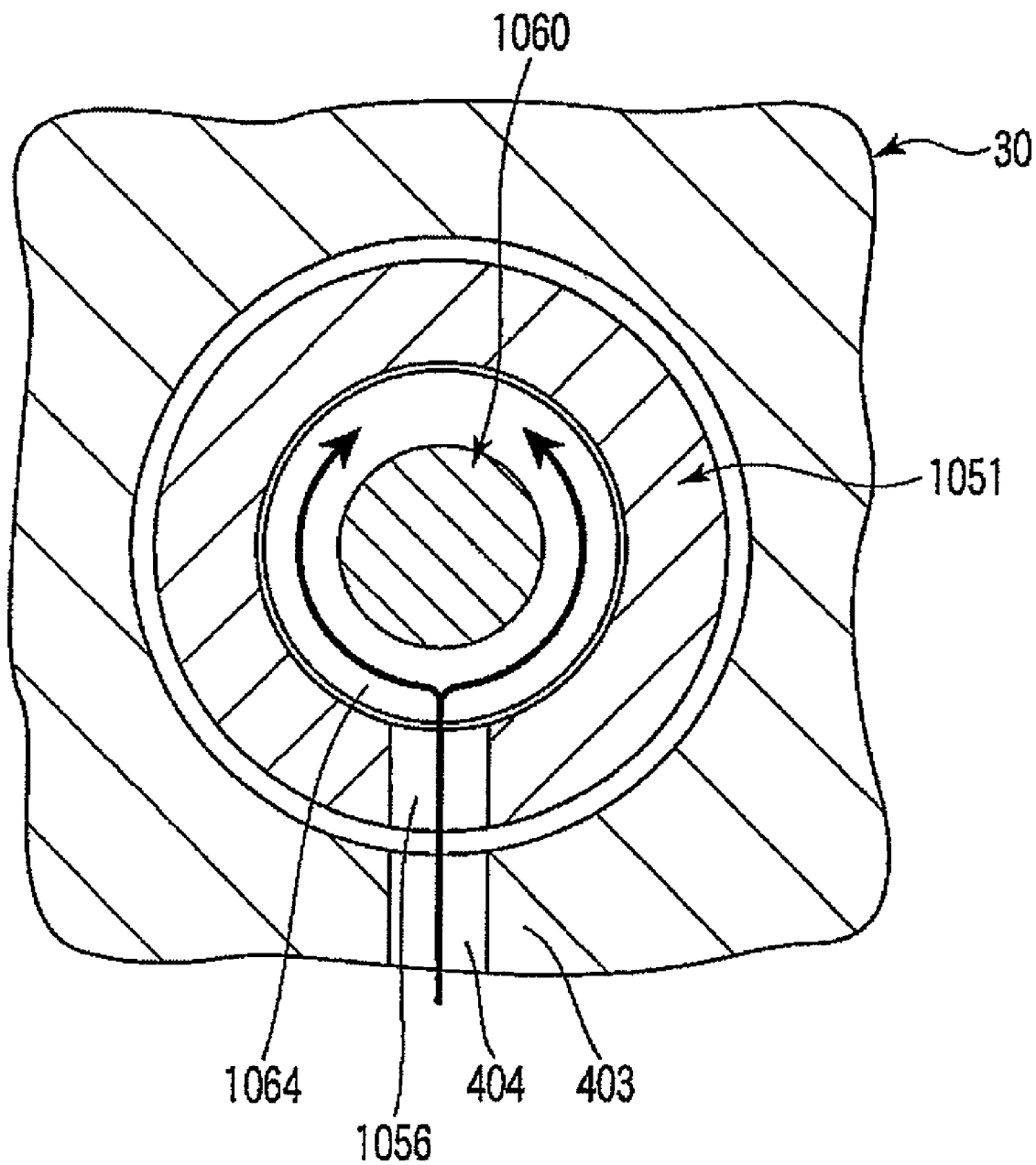
FIG. 16 is a sectional view of a vent valve device along the line F16-F16 shown in FIG. 14.

FIG. 16 is a sectional view along the line F16-F16 shown in FIG. 14. FIG. 16 shows cross sections of the third vent valve device opening 1056 and the second groove 1064 and the first groove 1063 in the state in which the vent valve device plug 1060 is in the vent valve device discharge position P6.

As shown in FIG. 14 and FIG. 16, when the vent valve device plug 1060 is in the vent valve device discharge position P6, the outlet 35 communicates with the outer side of the housing 20 via the retaining hole 1053 and the first groove 1063. Moreover, the space A communicates with the outer side of the housing 20 via the pore 404, the third vent valve device opening 1056, the second groove 1064, and the first groove 1063. The first and second grooves 1063 and 1064 form what is referred to in the present invention as a second vent valve device channel.

Accordingly, when the vent valve device plug 1060 is in the vent valve device discharge position P6, a gas G1 such as air remaining in the outlet 35 and a gas G2 such as air remaining in the spaces A and B are discharged to outside of the housing 20.

As shown in FIG. 11, in the case of the filter device 10 constructed in such a manner, while the operating oil L1 that is to be filtered is being filtered, the vent valve device plug 1060 is in the vent valve device non-discharge position P5 due to the fact that it is pushed in. Since the outlet is located above the drawing in this embodiment, they are not depicted. Since the inlet is disposed deep inside the filter device 10, it is not depicted. The filtered operating oil L2 flows from an end part 35*a* of the outlet 35 into the inlet.

When discharging a gas such as air from the housing 20 to outside of the housing 20, the vent valve device plug 1060 is moved to the vent valve device discharge position P6 by pulling the vent valve device plug 1060. When the vent valve device plug 1060 is moved to the vent valve device discharge position P6, a gas G1 such as air in the outlet 35 and a gas G2 such as air remaining in the spaces A and B are discharged to outside of the housing 20.

Furthermore, when replacing the filter element 40, the vent valve device plug 1060 moves to the vent valve device discharge position P6, even when the operating oil is discharged from the housing 20 to outside of the housing 20 by the drain device 50.

Due to the fact that the vent valve device plug 1060 moves to the vent valve device discharge position P6 when discharging the operating oil L1 and L2, air flows into the inner side 42a of the inner cylinder 42 and the outside of the housing 20, since the inner side 42a of the inner cylinder 42 communicate with each other. Accordingly, it becomes easy to discharge the operating oil L2 from the inner side 42a. Similarly, it becomes easy to discharge the operating oil L1 since air flows into the space B as well.

The filter device 10 constructed in such a manner is able to simultaneously discharge the gas G1 and the gas G2 remaining in the spaces A and B and in the inner side 42a of the filter element 40. Therefore, it is possible to reduce the time required to discharge a gas such as air from the housing 20.

It is also possible to reduce the time required to discharge operating oil from the housing 20, since air is able to flow into the inner side 42a of the inner cylinder 42 and into the space B when discharging the operating oil from the housing 20 using the drain device 50.

Moreover, since the vent valve device plug 1060 takes a shape which extends in one direction, it is sufficient to pull and push in the vent valve device plug 1060, when shifting the vent valve device plug 1060 between the vent valve device non-discharge position P5 and the valve device discharge position P6. Accordingly, the operation of the vent valve device plug 1060 becomes simpler, and the operating efficiency of the vent valve device plug 1060 increases.

Figure 17:
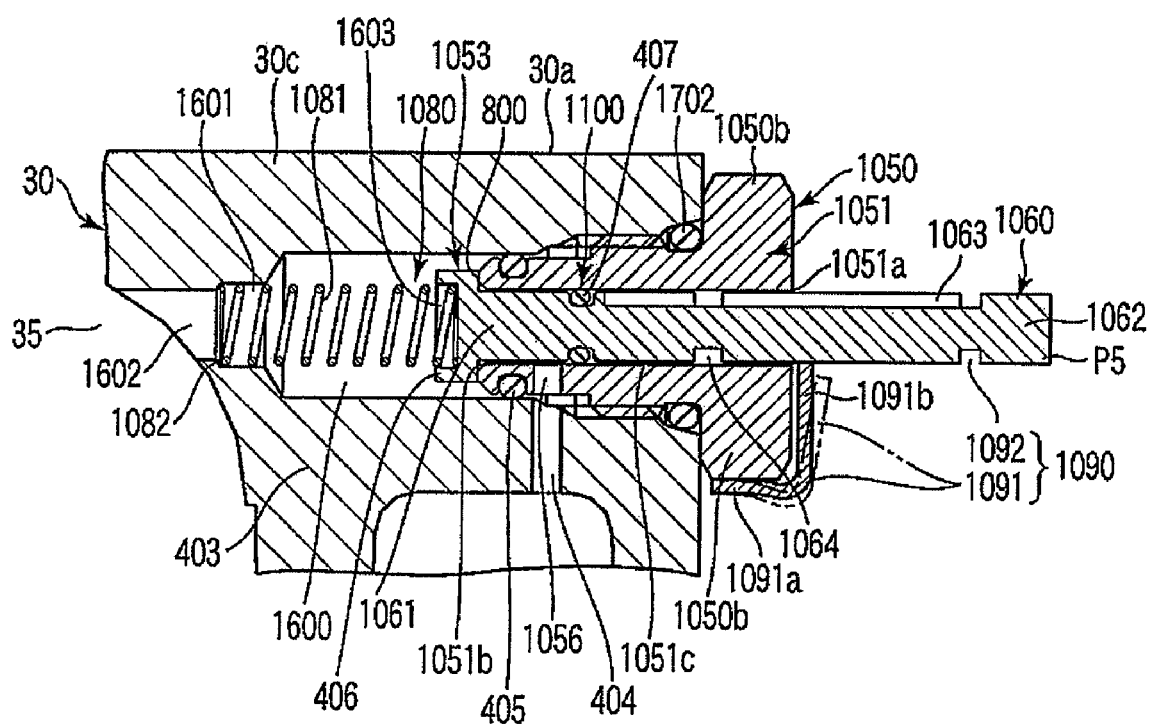
FIG. 17 is a sectional view showing an enlargement of the vicinity of a vent valve device of a filter device according to the sixth embodiment.
Figure 18:
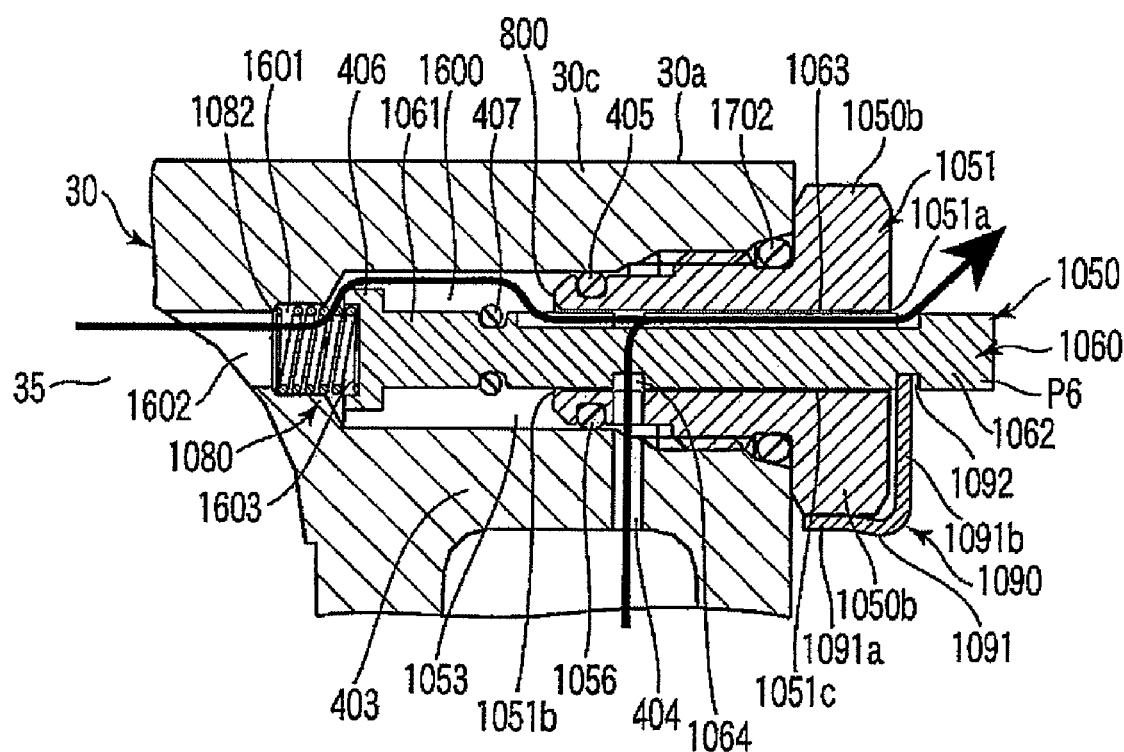
FIG. 18 is a sectional view showing the state in which the vent valve plug shown in FIG. 17 is in the vent valve device discharge position.

Next, the filter device 10 according to a sixth embodiment of the present invention is described using FIG. 17 and FIG. 18. Structures having the same functions as in the fifth embodiment are assigned the same reference numerals, and a description thereof is omitted.

In this embodiment, the construction of the vent valve device 1050 differs from that of the fifth embodiment. In detail, the fact that the vent valve device 1050 is provided with a vent valve device positioning mechanism 1080 and a vent valve device holding mechanism 1090 is a point that differs from the first embodiment. This point is explained in detail below.

FIG. 17 is a sectional view showing an enlargement of the vicinity of the vent valve device 1050 of the filter device 10 of this embodiment. FIG. 17 shows the state in which the vent valve device plug 1060 is in the vent valve device non-discharge position P5. FIG. 18 is a sectional view showing the state in which the vent valve plug 1060 is in the vent valve device discharge position P6.

As shown in FIG. 17 and FIG. 18, the vent valve device 1050 is provided with a vent valve device positioning mechanism 1080. The vent valve device positioning mechanism 1080 is provided with a vent valve device coil spring 1081, a step-like gradation 1082, a spring support hole 1603, a latch part 406, and the second vent valve device opening side end surface 800. The vent valve device coil spring 1081 is an example of what is referred to in the present invention as a vent valve device impelling member.

The step-like gradation 1082 is now described. The retaining hole 1053 has a vent valve device first part 1600, a vent valve device second part 1601, and a vent valve device third part 1602. The vent valve device first part 1600 is a part to hold the vent valve device main body 1051 in the retaining hole 1053. The vent valve device second part 1601 is a part adjacent to the vent valve device first part 1600 in the retaining hole 1053. The vent valve device second part 1601 is narrower in the radial direction than the vent valve device first part 1600. The vent valve device second part 1601 extends along the sliding direction of the vent valve device plug 1060.

The vent valve device third part 1602 is a part on the side opposite from the vent valve device first part 1600, with the vent valve device second part 1601 disposed between them. The vent valve device third part 1602 communicates with the outlet 35. The vent valve device third part 1602 is narrower in the radial direction than the vent valve device second part 1601. Thus, the step-like gradation 1082 is formed between the vent valve device second part 1601 and the valve device third part 1602 on the inner periphery of the retaining hole 1053.

A spring support hole 1603 is formed on the latch part 406 of the vent valve device plug 1060. The spring support hole 1603 is concave in the sliding direction of the vent valve device plug 1060.

One end of the vent valve device coil spring 1081 is supported by the vent valve device plug 1060 since it is held within the spring support hole 1603. The other end of the vent valve device coil spring 1081 makes contact with the a step-like gradation 1082 since it is held within the vent valve device second part 1601, and is supported by the head 30.

Due to the arrangement of the vent valve device coil spring 1081 as described above, the vent valve device coil spring 1081 is disposed between the step-like gradation 1082 and the latch part 406. Accordingly, the vent valve device plug 1060 is impelled by the elastic force of the vent valve device coil spring 1081 from the vent valve device discharge position P6 to the vent valve device non-discharge position P5, and is positioned at the vent valve device non-discharge position P5 due to the fact that the latch part 406 comes into contact with the second vent valve device opening side end surface 800. The latch part 406 is what is referred to in the present invention as a vent valve device first contact part. The second vent valve device opening side end surface 800 is what is referred to in the present invention as a vent valve device second contact part.

The vent valve device holding mechanism 1090 is provided with a vent valve device holding member 1091 and a vent valve device groove 1092. The vent valve device holding member 1091 has a vent valve device main body 1091a and a vent valve engaging part 1091b. The vent valve device main body 1091a is immobilized on the outer periphery of the latch part 1050b. The vent valve engaging part 1091b is bent approximately in an L-shape with respect to the vent valve device main body 1091a, turning into the front end of the vent valve device main body 1051 and extending toward the vent valve device plug 1060.

The vent valve device groove 1092 is formed on the outer periphery of the vent valve device plug 1060. The vent valve engaging part 1091b engages with the vent valve device groove 1092. As shown in FIG. 18, when the vent valve device plug 1060 is in the vent valve device discharge position P6, the vent valve device groove 1092 is positioned so as to engage with the vent valve engaging part 1091b. The vent valve device plug 1060 is held in the vent valve device discharge position P6, due to the fact that the vent valve engaging part 1091b engages with the vent valve device groove 1092.

As shown by the double-dotted line in FIG. 17, the vent valve device main body 1091a has flexibility, for example, to enable the vent valve engaging part 1091b to come out from the vent valve device groove 1092. Accordingly, when the vent valve device plug 1060 returns to the vent valve device non-discharge position P5, the vent valve engaging part 1091b detaches from the vent valve device groove 1092, due to the flexing of the vent valve device main body 1091a, as shown by the double-dotted line in the drawing.

When the vent valve engaging part 1091b exits from the vent valve device groove 1092, the vent valve device plug 1060 is impelled toward the vent valve device non-discharge position P5, due to the impulsive force of the vent valve device coil spring 1081.

In this embodiment, when the filter device 10 is used, the vent valve device plug 1060 is positioned at the vent valve device non-discharge position P5, due to the fact that the filter device 10 is provided with the vent valve device positioning mechanism 1080. Moreover since the vent valve device positioning mechanism 1080 has a construction that uses the vent valve device coil spring 1081, it is sufficient to press the vent valve device plug 1060, when shifting the vent valve device plug 1060 to the valve device discharge position P6. Thus, the efficiency of the operation of discharging the operating oil L1 and L2 is enhanced.

Furthermore, due to the fact that the filter device 10 is provided with the vent valve device holding mechanism 1090, the vent valve device plug 1060 can be held at the valve device discharge position P6, thereby making it possible to enhance the efficiency of the operation of discharging the gas G1, G2 and the operation of discharging the operating oil L1, L2 from the housing 20.

Moreover, it is possible to keep down the cost of the filter device 10, since the vent valve device holding mechanism 1090 has a simple structure that uses the vent valve device holding member 1091 and the vent valve device groove 1092.

Figure 19:
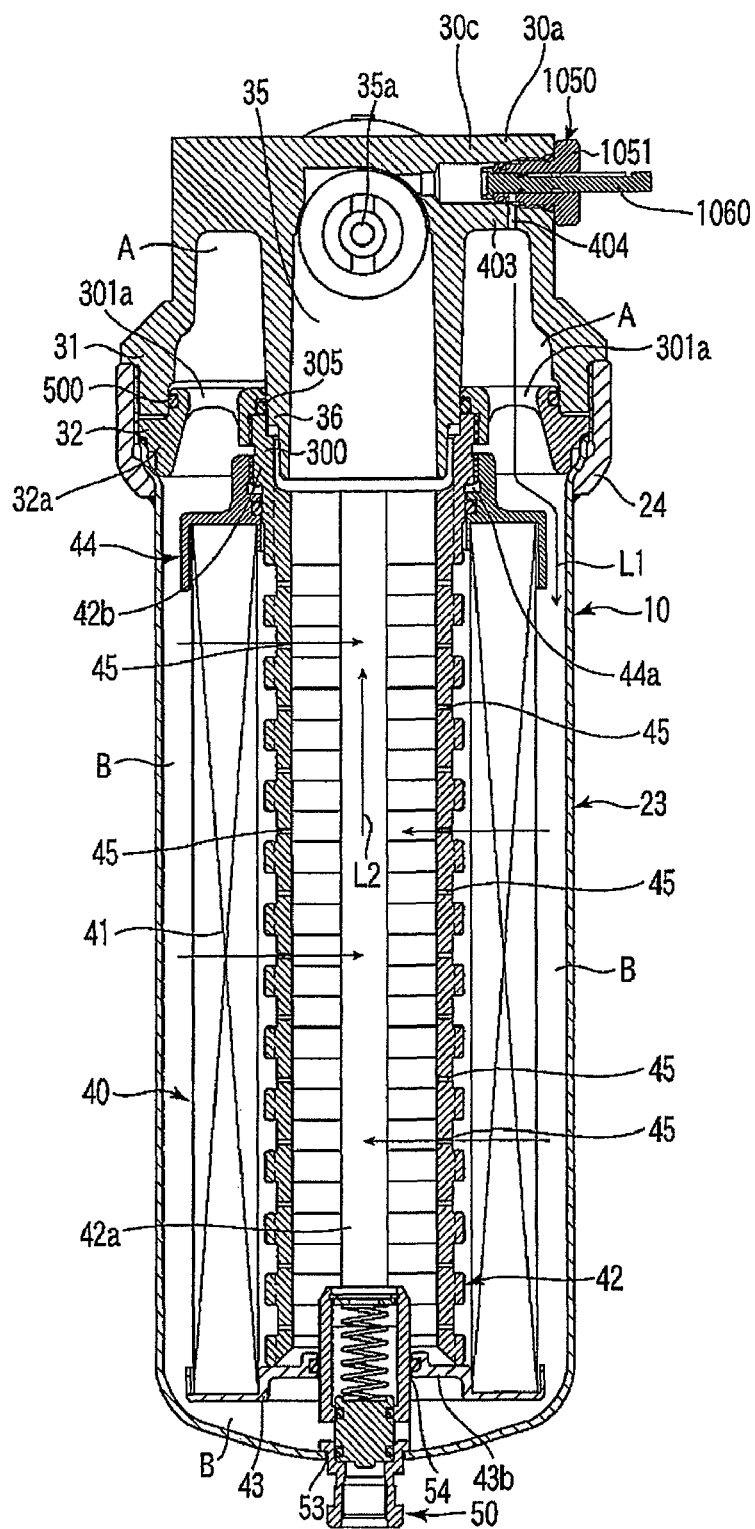
FIG. 19 is a sectional view of a filter device according to the seventh embodiment.

Next, a filter device according to the seventh embodiment of the present invention is described using FIG. 19. Structures having the same functions as in the third and fifth embodiments are assigned the same reference numerals, and a description thereof is omitted. This embodiment differs from the third and fifth embodiments in that the filter device 10 provided with the drain device 50 described in the third embodiment is provided with the vent valve device 1050 described in the fifth embodiment. In this embodiment, the same advantageous effects are obtained as in the third and fifth embodiments.

INDUSTRIAL UTILITY

The present invention makes it possible to efficiently replace the filter element, since the time required to discharge fluid from the housing can be shortened.

The invention claimed is:

1. A filter device comprising:
   a cylindrical filter element having an annular surrounding wall, said filter element being configured to filter fluid by allowing the fluid to pass through the surrounding wall between an inner side and an outer side of the surrounding wall;
   a housing disposed around the filter element;
   a drain device that discharges fluid from the housing, said drain device comprising:
      a main body having a first opening that communicates outside of the housing, a second opening that communicates with the inner side of the filter element, wherein a portion of the main body defines a first channel extending longitudinally through the main body, the first channel communicating with the first and second openings, and a third opening that communicates between the first channel and a space between the filter element and the housing, the main body having a first inwardly protruding portion having a first main body sealing surface that extends longitudinally along an inner surface of the main body defining the first channel, and a second inwardly protruding portion having a second main body sealing surface that extends laterally toward a center of the first channel from the inner surface of the main body;
      a held member slidably disposed in the first channel, the held member being slidable between a non-discharge position, and a discharge position, the held member remaining disposed within the first channel of the main body in both the discharge and non-discharge positions, the held member comprising:
         a pressure receiving face disposed at a first end thereof that receives pressure, the pressure forcing the held member toward the non-discharge position;
         a first held member sealing surface extending longitudinally from a periphery of the pressure receiving face; and
         a reaction surface disposed opposite the pressure receiving surface, the reaction surface having a laterally extending face that extends inwardly toward a center of the held member, the laterally extending face forming a second held member sealing surface;
      wherein, when the held member is in the non-discharge position, the first held member sealing surface sealingly engages the first main body sealing surface and the second held member sealing surface sealingly engages the second main body sealing surface, whereby the sealing engagement between the first and second held member and main body sealing surfaces prevents fluid communication between the first opening, the second opening, and the third opening of the main body;
      wherein, when the held member is in the second position, the first held member sealing surface is disengaged with and longitudinally spaced away from the first main body sealing surface thereby creating a first space between the first held member sealing surface and the inner surface of the main body in the first channel, and the second held member sealing surface is disengaged with and longitudinally spaced away from the second main body sealing surface thereby creating a second space between the laterally extending second held member and main body sealing surfaces, the first and second spaces providing fluid communication between the first and second and third openings of the main body;
   an inserted member that is readily detachably removably inserted into the first channel through the first opening, the inserted member having a channel disposed therein that communicates between the outside of the housing and the first opening, wherein when the inserted member is inserted into the first channel through the first opening, the inserted member engages the held member and exerts a biasing force sufficient to counteract the pressure received by the pressure receiving surface, thereby moving the held member from the non-discharqe position to the discharge position; and
   a seal structure that, when the held member is in the non-discharge position, liquid-tightly seals between the second opening and the third opening and fluid-tightly sealing between the inner side of the filter element and the outer side of the housing and between the outer side of the housing and the space between the filter element and the housing.

2. A filter device of claim 1, wherein the seal structure comprises a plurality of seal members disposed along a side wall of the held member in the direction of movement of the held member such that when the held member is in the non-discharge position, the third opening is disposed between at least two of the seal members, the at least two seal members being in sealing contact with the inner wall of the main body and fluid-tightly sealing the third, wherein the plurality of seal members are disposed in positions that run parallel to the direction of the movement of the held member.

3. A filter device of claim 1, further comprising a vent valve device which comprises:
- a vent valve device main body having a first vent valve device opening that communicates outside of the housing, a second vent valve device opening that communicates inside of the filter element, a first vent valve device channel that communicates between the first vent valve device opening and the second vent valve device opening, and a third vent valve device opening that communicates between the first vent valve device channel and a space between the filter element and the housing;
- a vent valve device plug which is held within the first vent valve device channel and movable between a vent valve device non-discharge position at which gas is not discharged from the housing and a vent valve device discharge position at which gas is discharged from the housing, wherein the vent valve device plug has a second vent valve device channel that, when being in the vent valve device discharge position, communicates between the second vent valve device opening and the third vent valve device opening as well as outside of the housing through the first vent valve device opening; and
- a vent valve device seal structure which, when the vent valve device plug is in the vent valve device non-discharge position, air-tightly seals between the inner side of the filter element and the outer side of the housing and between the outer side of the housing and a space between the filter element and the housing.

4. A filter device of claim 3, further comprising a vent valve device positioning mechanism which positions the vent valve device plug in the vent valve device non-discharge position.

5. A filter device of claim 4, wherein the vent valve device positioning mechanism comprises:
- a vent valve device impelling member which impels the vent valve device plug from the vent valve device discharge position toward the vent valve device non-discharge position;
- a first vent valve device contact part disposed on the vent valve device plug; and
- a second vent valve device contact disposed on the vent valve device main body, wherein the second vent valve device contact part makes contact with the first vent valve device contact part in the direction of impulsion of the vent valve device impelling member when the vent valve device plug is in the vent valve device non-discharge position.

6. A filter device of claim 3, further comprising a vent valve device holding mechanism that holds the vent valve device plug in the vent valve device discharge position when the vent valve device plug is in the vent valve device discharging position.

7. A filter device of claim 6, wherein the vent valve device holding mechanism comprises a vent valve groove formed in the vent valve device plug, and a vent valve device engaging part disposed in the vent valve device main body and removably held in the groove.

* * * * *